US010955665B2

(12) United States Patent
Salter et al.

(10) Patent No.: US 10,955,665 B2
(45) Date of Patent: Mar. 23, 2021

(54) CONCURRENT OPTIMAL VIEWING OF VIRTUAL OBJECTS

(71) Applicant: Microsoft Technology Licensing, LLC, Redmond, WA (US)

(72) Inventors: Tom G. Salter, Seattle, WA (US); Ben J. Sugden, Woodinville, WA (US); Daniel Deptford, Redmond, WA (US); Robert L. Crocco, Jr., Seattle, WA (US); Brian E. Keane, Bellevue, WA (US); Laura K. Massey, Redmond, WA (US); Alex Aben-Athar Kipman, Redmond, WA (US); Peter Tobias Kinnebrew, Seattle, WA (US); Nicholas Ferianc Kamuda, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 206 days.

(21) Appl. No.: 13/921,113

(22) Filed: Jun. 18, 2013

(65) Prior Publication Data
US 2014/0368534 A1   Dec. 18, 2014

(51) Int. Cl.
*G06T 19/00* (2011.01)
*G09G 5/00* (2006.01)
(Continued)

(52) U.S. Cl.
CPC ............ *G02B 27/017* (2013.01); *G06F 3/011* (2013.01); *G06F 3/012* (2013.01); *G06F 3/017* (2013.01);
(Continued)

(58) Field of Classification Search
CPC . G06T 19/006; G06T 2219/024; G06T 7/004; G06T 2215/16; H04N 13/0278;
(Continued)

(56) References Cited

U.S. PATENT DOCUMENTS 6,522,312 B2 * 2/2003 Ohshima ................. A63F 13/00
273/309
7,289,130 B1 * 10/2007 Satoh ...................... A63F 13/10
345/629

(Continued)

FOREIGN PATENT DOCUMENTS

CN       102591449 A      7/2012

OTHER PUBLICATIONS

Katdare, Ankita, "Kinect & Transparent EL Screen Create Holographic 3D Display—Second Story Labs", Published on: Jun. 6, 2012, Available at: http://www.crazyengineers.com/kinect-transparent-el-screen-create-holographic-3d-display-second-story-labs-2252/.

(Continued)

*Primary Examiner* — Jin Cheng Wang
(74) *Attorney, Agent, or Firm* — Arent Fox LLP

(57) ABSTRACT

A see through head mounted display apparatus includes code performing a method of choosing and optimal viewing location and perspective for shared-view virtual objects rendered for multiple users in a common environment. Multiple objects and multiple users are taken into account in determining the optimal, common viewing location. The technology allows each user to have a common view if the relative position of the object in the environment.

28 Claims, 18 Drawing Sheets

(51) Int. Cl.
    *G02B 27/01*    (2006.01)
    *G06F 3/01*    (2006.01)
(52) U.S. Cl.
    CPC ........ *G06T 19/006* (2013.01); *G06T 2215/16* (2013.01); *G06T 2219/024* (2013.01); *G09G 2354/00* (2013.01)
(58) Field of Classification Search
    CPC .... G09G 3/003; G09G 2354/00; G06F 3/011; G06F 3/012; G06F 3/017
    USPC .......................................... 345/419, 632–633
    See application file for complete search history.

(56) References Cited

U.S. PATENT DOCUMENTS

| | | | |
|---|---|---|---|
| 7,425,069 | B2 | 9/2008 | Schwerdtner et al. |
| 7,995,076 | B2 | 8/2011 | Emam et al. |
| 8,730,156 | B2* | 5/2014 | Weising .................. G09G 5/08 345/156 |
| 2002/0037768 | A1* | 3/2002 | Ohshima ................. G06F 3/017 463/30 |
| 2002/0084974 | A1* | 7/2002 | Ohshima ................. A63F 13/00 345/156 |
| 2004/0109009 | A1* | 6/2004 | Yonezawa ............... G06T 15/20 345/632 |
| 2005/0024388 | A1* | 2/2005 | Takemoto ............. G06T 19/006 345/633 |
| 2005/0168486 | A1* | 8/2005 | Sato ........................ A63F 13/10 345/633 |
| 2007/0027591 | A1* | 2/2007 | Goldenberg ........ G06F 17/3087 701/23 |
| 2008/0204834 | A1 | 8/2008 | Hill |
| 2010/0287485 | A1* | 11/2010 | Bertolami ............... G06F 3/011 715/764 |
| 2011/0205243 | A1* | 8/2011 | Matsuda ................. G06F 3/011 345/633 |
| 2011/0216002 | A1 | 9/2011 | Weising et al. |
| 2011/0216060 | A1* | 9/2011 | Weising .................. G09G 5/08 345/419 |
| 2011/0216160 | A1 | 9/2011 | Martin |
| 2011/0298824 | A1* | 12/2011 | Lee ......................... G06F 3/011 345/633 |
| 2012/0105437 | A1 | 5/2012 | Yasuda |
| 2012/0105473 | A1 | 5/2012 | Bar-Zeev et al. |
| 2012/0154557 | A1 | 6/2012 | Perez et al. |
| 2012/0210254 | A1* | 8/2012 | Fukuchi ................. G06F 3/012 715/757 |
| 2012/0249741 | A1* | 10/2012 | Maciocci ................ G06F 3/011 348/46 |
| 2012/0314936 | A1* | 12/2012 | Ishige ................... G06T 19/006 382/154 |
| 2013/0038510 | A1 | 2/2013 | Brin et al. |
| 2013/0044042 | A1 | 2/2013 | Olsson et al. |
| 2013/0044129 | A1* | 2/2013 | Latta et al. .................... 345/633 |
| 2013/0141419 | A1* | 6/2013 | Mount et al. ................. 345/419 |
| 2013/0194304 | A1* | 8/2013 | Latta et al. .................... 345/633 |
| 2013/0196772 | A1* | 8/2013 | Latta et al. ...................... 463/42 |
| 2013/0215149 | A1* | 8/2013 | Hayashi ................. G06T 19/00 345/633 |
| 2013/0257907 | A1* | 10/2013 | Matsui ................... G09G 5/377 345/633 |
| 2013/0300637 | A1* | 11/2013 | Smits et al. ....................... 345/8 |
| 2014/0313228 | A1* | 10/2014 | Kasahara .............. G06T 19/006 345/633 |
| 2016/0214011 | A1* | 7/2016 | Weising .................. A63F 13/40 |

OTHER PUBLICATIONS

Wilson, Mark, "zSpace: A Real Holographic Display Worthy of Iron Man", Retrieved on: Oct. 9, 2012, Available at: http://www.fastcodesign.com/1670251/zspace-a-real-holographic-display-worthy-of-iron-man#1.
Surman, et al., "Head Tracked Single and Multi-user Autostereoscopic Displays", In Proceedings of 3rd European Conference on Visual Media Production, Nov. 2006, pp. 9.
Buckley, et al., "Multi-Viewer Autostereoscopic Display with Dynamically-addressable Holographic Backlight", In of Proceedings SID Symposium, No. 25.1, May 2008, pp. 6.
International Search Report & Written Opinion dated Oct. 16, 2014, in PCT Patent Application No. PCT/US2014/042658 filed Jun. 17, 2014.
Ohlenburg, et al., "The MORGAN Framework: Enabling Dynamic Multi-user AR and VR projects", In Proceedings of the ACM Symposium on Virtual Reality Software and Technology, Nov. 10, 2004, pp. 166-169.
"International Preliminary Report on Patentability Issued in PCT Application No. PCT/US2014/042658", dated Oct. 5, 2015, 11 Pages.
Voluntary Amendments, and English translation of amended claims, filed on Jul. 21, 2016 in Chinese Patent Application No. 201480035136.4, 14 Pages.
"First Office Action and Search Report Issued in Chinese Patent Application No. 201480035136.4" dated Jan. 9, 2018, 13 Pages.
"Second Office Action Issued in Chinese Patent Application No. 201480035136.4", dated Sep. 4, 2018, 7 Pages.

* cited by examiner

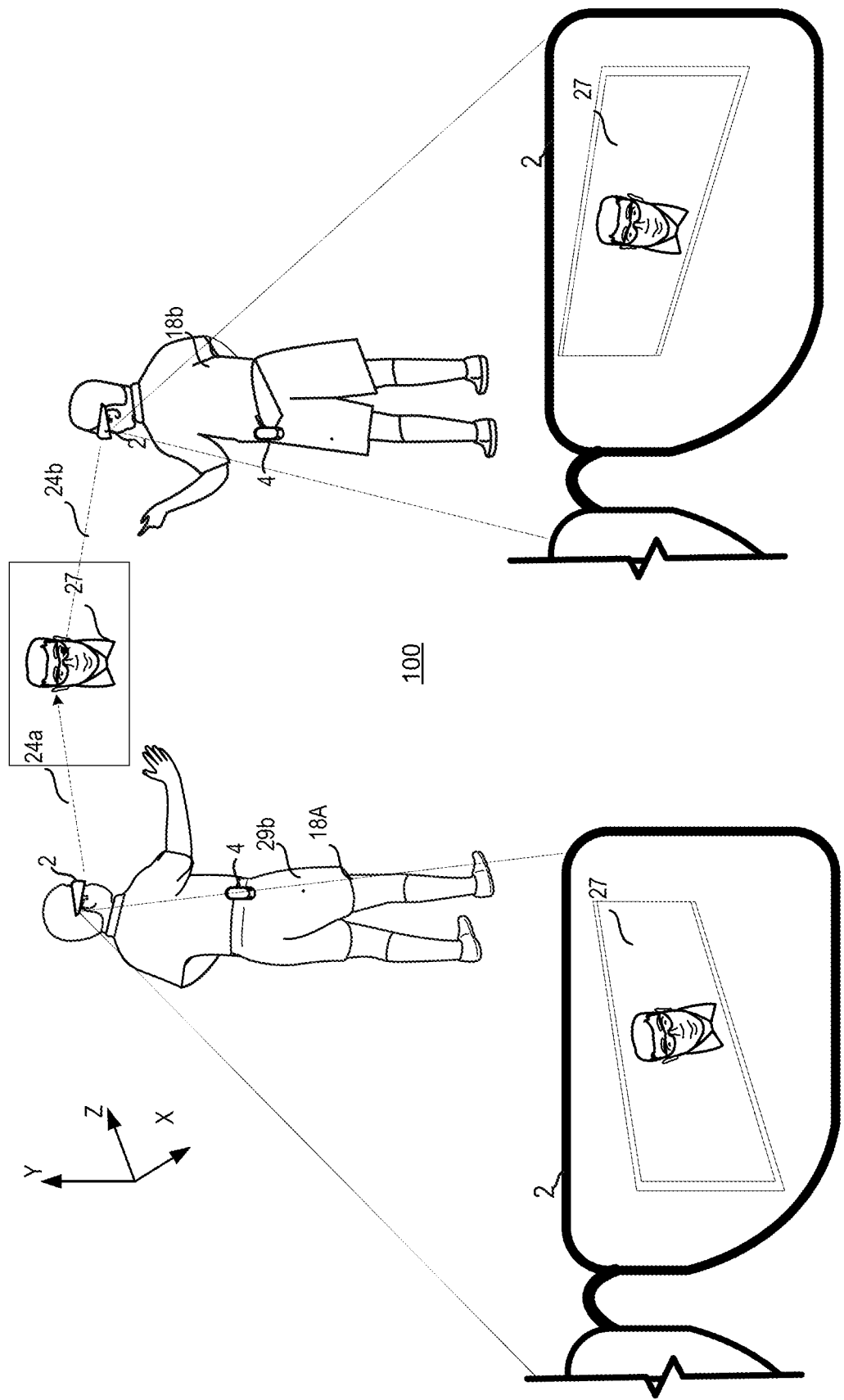

(Step 612)

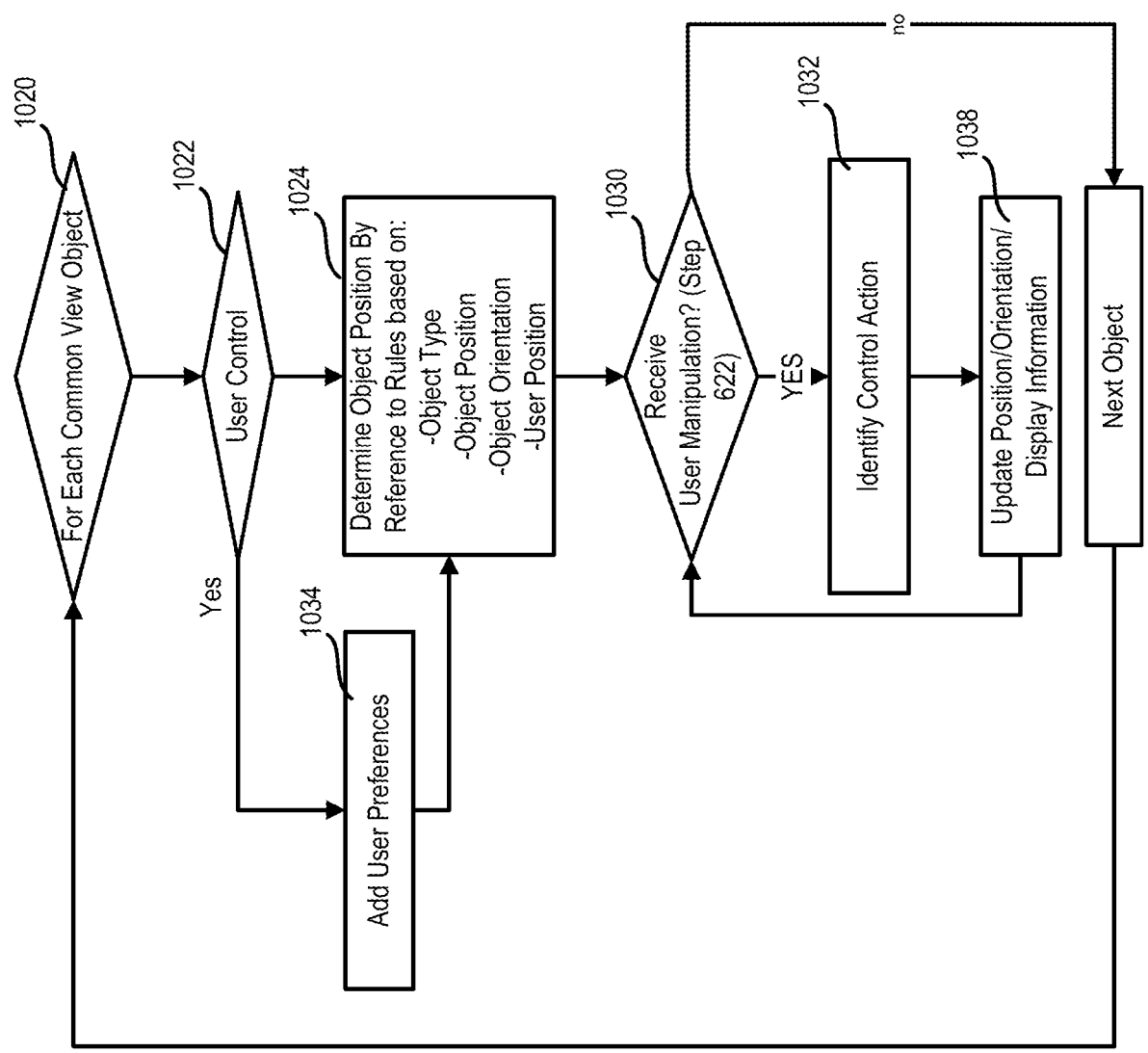

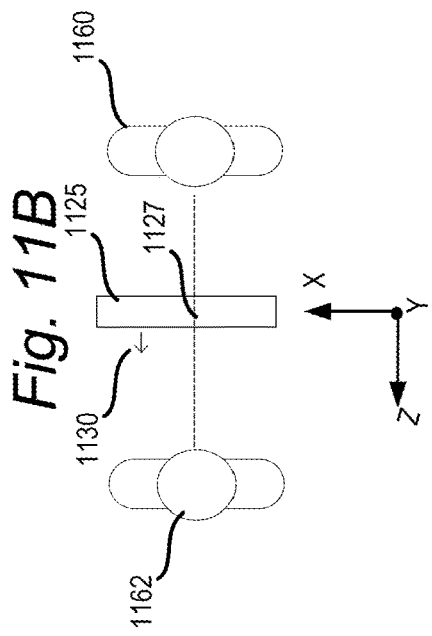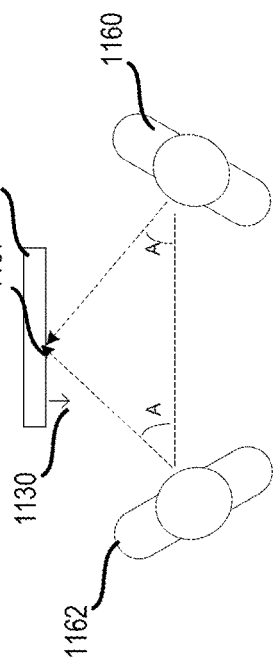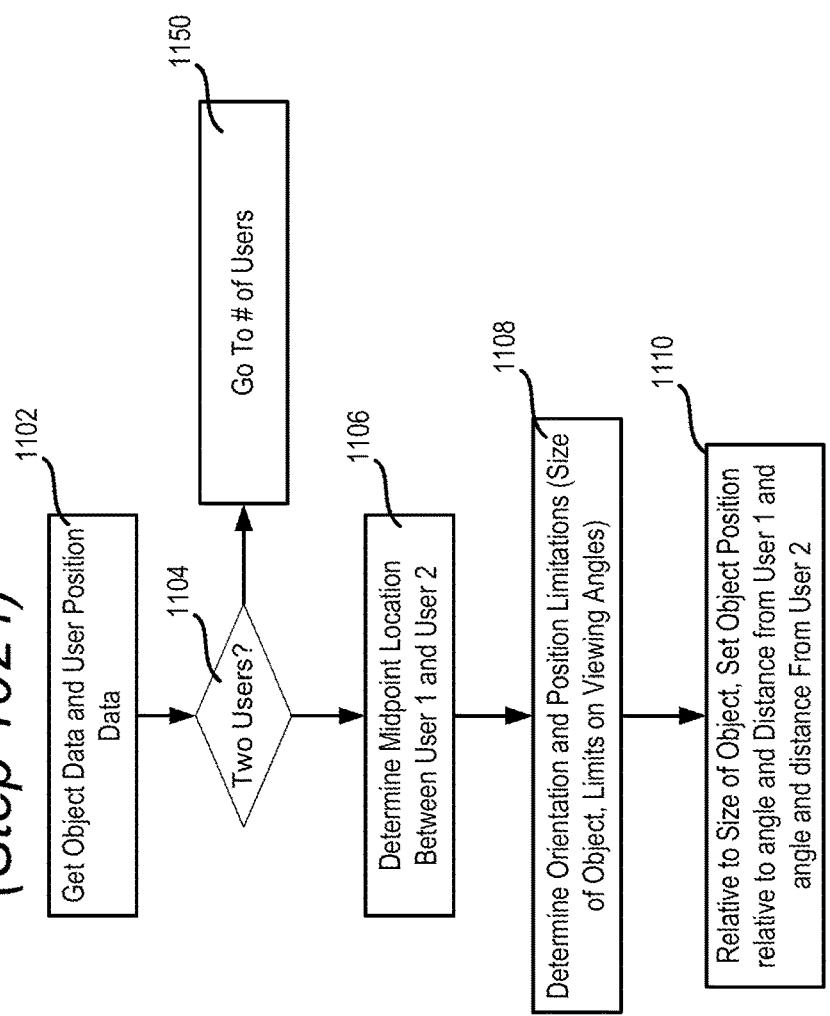

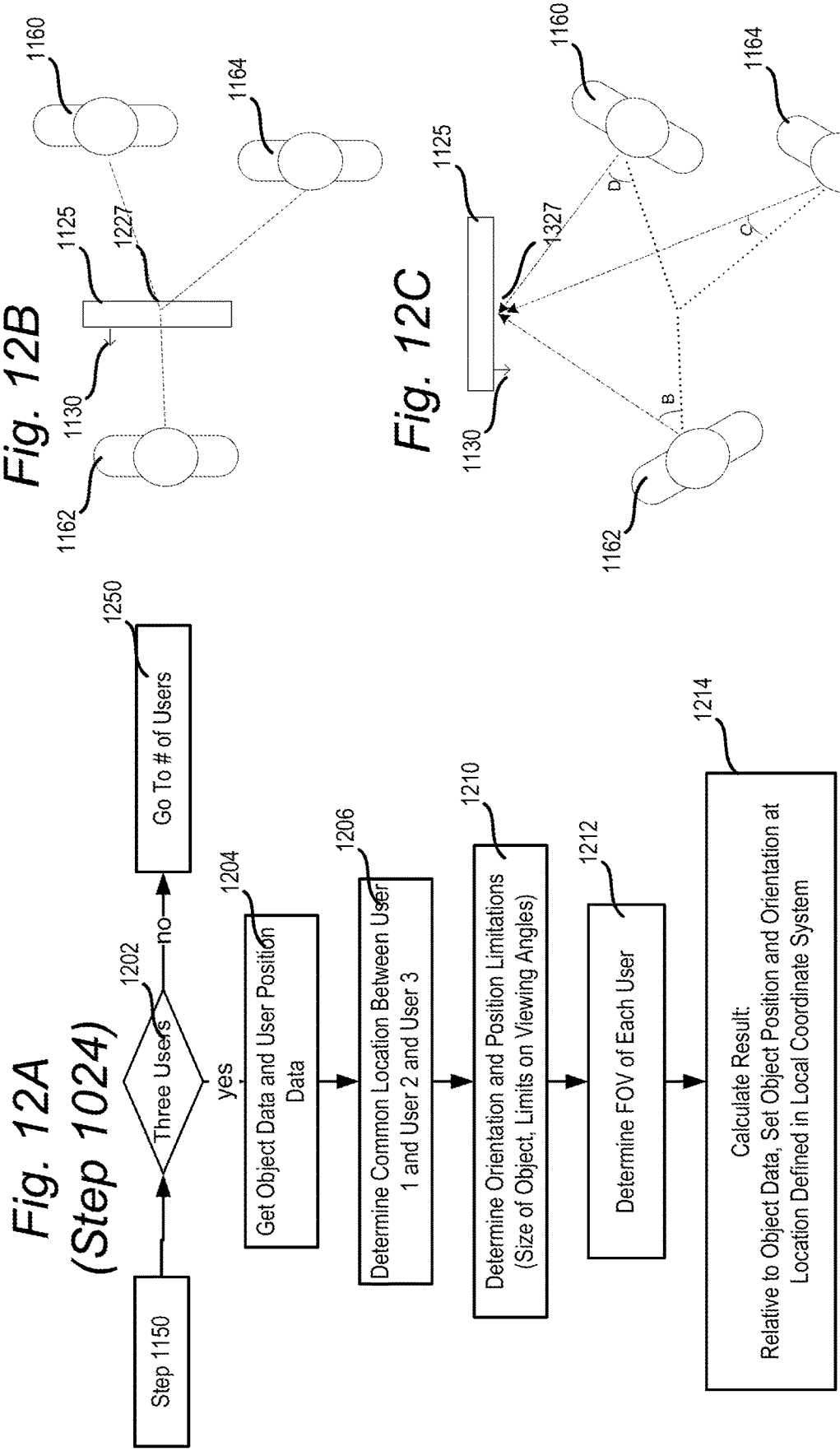

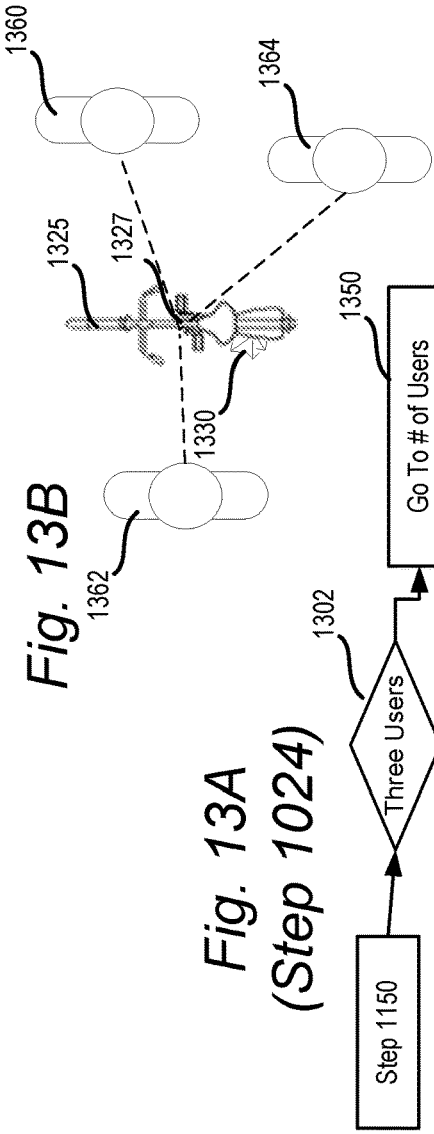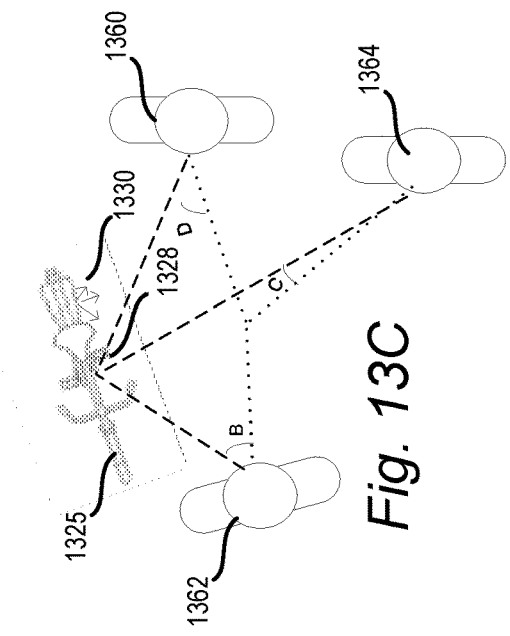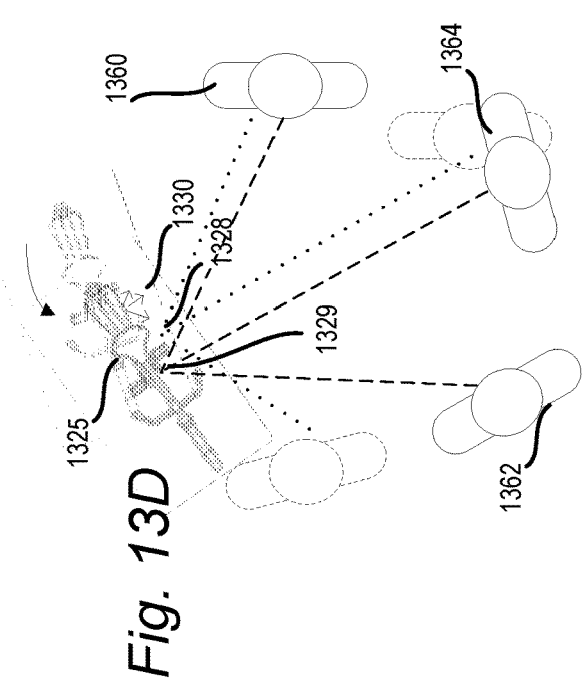

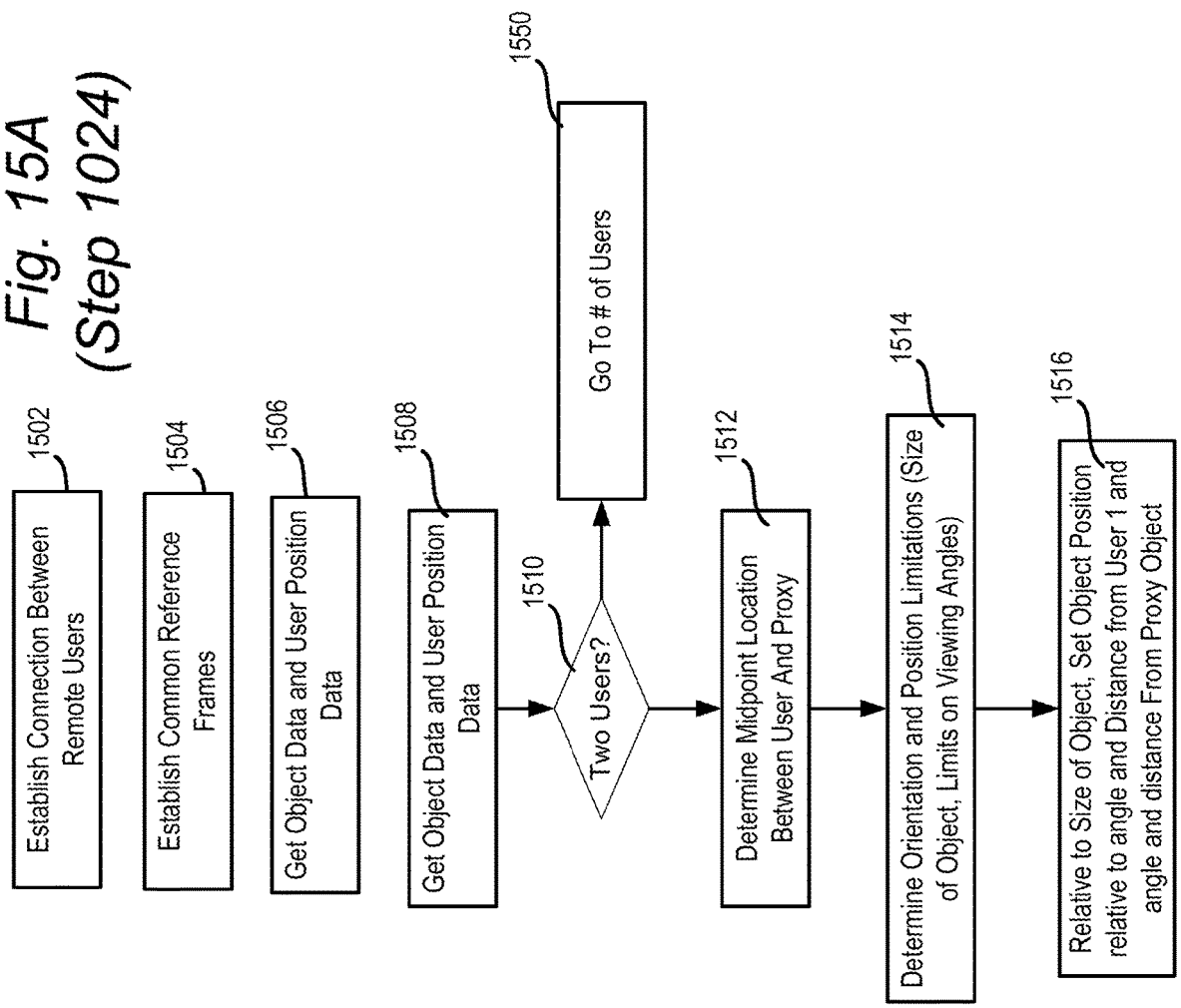

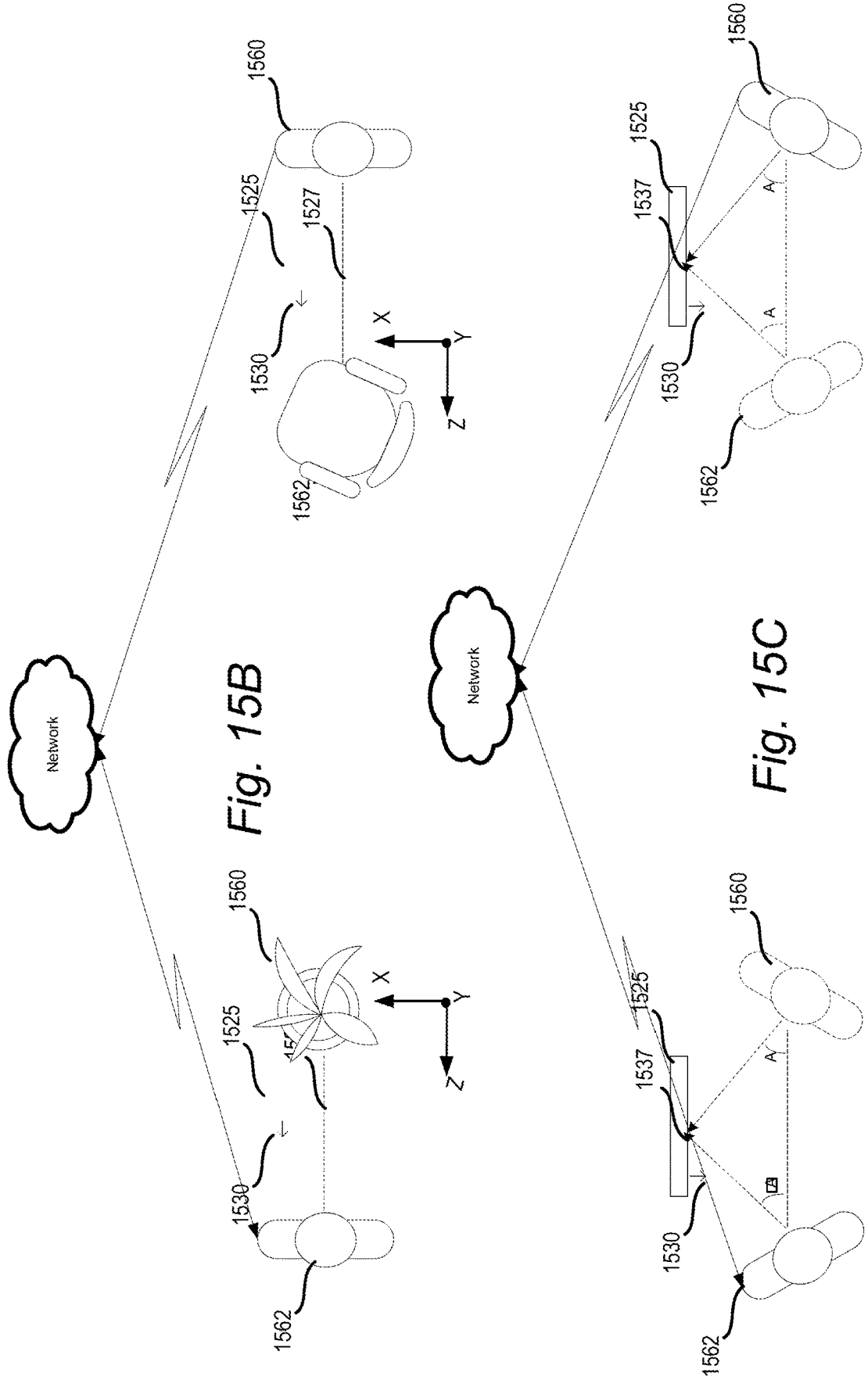

CONCURRENT OPTIMAL VIEWING OF VIRTUAL OBJECTS

BACKGROUND

Mixed reality is a technology that allows virtual imagery to be mixed with a real world physical environment. A see-through, head mounted display (HMD) device may be worn by a user to view the mixed imagery of real objects and virtual objects displayed in the user's field of view. A user may further interact with virtual objects, for example by performing hand, head or voice gestures to move the objects, alter their appearance or simply view them.

In order for multiple users to interact when both users are wearing see through head mounted displays, virtual objects rendered by user devices are to be shared. Each users of a device viewing a virtual object has a perspective of the object within their own field of view. One or more of the devices, alone or in conjunction with a hub computing system, may be used to determine the respective views of each user of a virtual object.

SUMMARY

Technology for presenting an optimized, shared view of virtual objects to wearers of see through head mounted display devices is provided. The technology chooses an optimal viewing location and orientation for shared-view virtual objects. The number of objects and users are taken into account in determining the optimal, common viewing location for the object. The technology allows each user to have a common view if the relative position of the object in a shared environment.

In one aspect, the position, orientation and field of view for multiple users in a common environment are determined. From this information and object definitions associated with the commonly viewed virtual object, a common optimal viewing position and orientation is determined for the object. This information is shared between the users to allow rendering of the commonly viewed virtual object at the position and in the orientation. The technology adjusts for movements of the object and/or the viewers of the object, as well as the number of users.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 1C the depiction of the users in FIG. 1B viewing a optimally placed virtual object.

FIG. 10 is a flowchart representing a method for implementing a step 616 FIG. 8.

FIG. 11A is a flowchart representing one method for implementing step 1024 in FIG. 10.

FIGS. 11B and 11C represent optimal placement of the virtual object respect to users in accordance with FIG. 11A.

FIG. 12A is a flowchart representing one method for implementing step 1024 in FIG. 10 with three users.

FIGS. 12B and 12C illustrate optimal placement of a virtual object with respect to three users.

FIG. 13A is a flowchart illustrating an alternative to the method of FIG. 12A.

FIGS. 13B-13D illustrate various positions of a virtual object and users where three users are viewing one virtual object.

FIG. 15A illustrates a method of resolving positional conflicts between commonly viewed objects for users in different physical environments.

FIGS. 15B and 15C illustrate various positions of virtual objects for users in different physical environments.

DETAILED DESCRIPTION

Figure 1A:
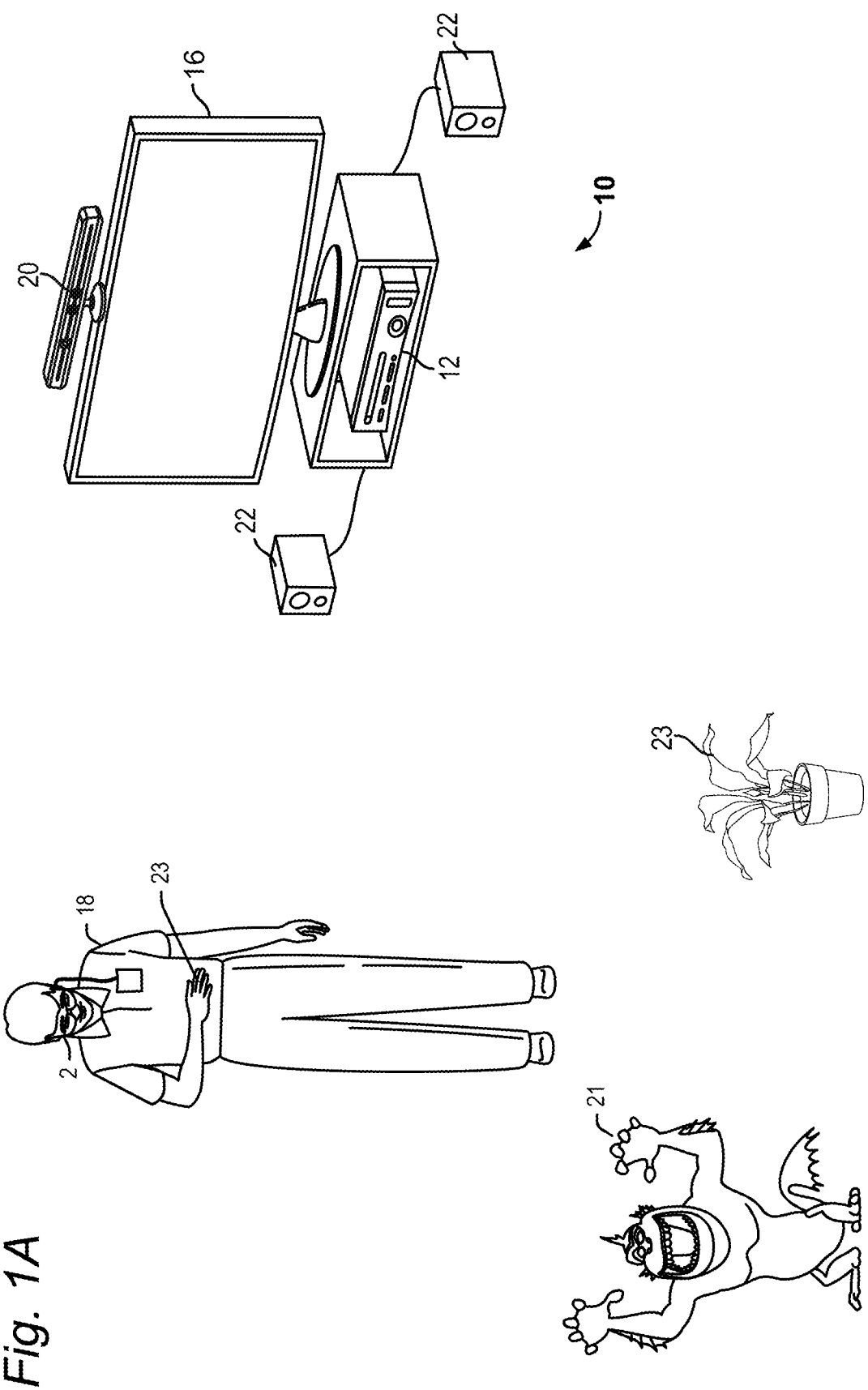
FIG. 1A is an illustration of example components of one embodiment of a system for presenting a mixed reality environment to one or more users.

Technology is presented to allow multiple users in a common environment or different environments to have an optimal or common relative view of a virtual object. Where two or more users equipped with see through HMD devices are presented with a virtual object, the presentation of such object may be in a location relative to each user such that each user may have an optimal experience with the object. Certain types of virtual objects do not lend themselves to either an identical object view (both users see the "front" of an object, even though the users are in physically different locations) or a user-centric object view (opposing users see the "front" and "back" of an object).

The technology chooses an optimal viewing location and perspective for shared-view virtual objects rendered for multiple users in a common environment or sharing a common virtual environment. Multiple objects and multiple users are taken into account in determining the optimal, common viewing location. The technology allows each user to have a common view of the relative position of the object in the environment.

Virtual objects may include an object definition. The definition may include data allowing the display device 2 to render the virtual object in the field of view of a user. One component of the definition may comprise an object type, object size, and one or more optimal viewing perspectives and orientation. Each optimal viewing perspective may comprise a definition of an optimal perspective for a user view of the object. When a virtual object is shared, the technology presented herein uses the object definition and the locations and field of view of each user with whom the object is shared to determine an optimal location at which to render the object for each user.

A head mounted display device may include a display element. The display element is to a degree transparent so that a user can look through the display element at real world objects within the user's field of view (FOV). The display element also provides the ability to project virtual images into the FOV of the user such that the virtual images may also appear alongside the real world objects. The system automatically tracks where the user is looking so that the system can determine where to insert the virtual image in the FOV of the user. Once the system knows where to project the virtual image, the image is projected using the display element.

In one alternative, the hub computing system and one or more of the processing units may cooperate to build a model of the environment including the x, y, z Cartesian positions of all users, real world objects and virtual three-dimensional objects in the room or other environment. The positions of each head mounted display device worn by the users in the environment may be calibrated to the model of the environment and to each other. This allows the system to determine each user's line of sight and FOV of the environment. Thus, a virtual object may be displayed to each user, but the display of the virtual image from each user's perspective may be relative, adjusting the virtual image for parallax and any occlusions from or by other objects in the environment. The model of the environment, referred to herein as a scene map, as well as all tracking of the user's FOV and objects in the environment may be generated by the hub and mobile processing unit working in tandem or individually.

In one embodiment, as a user moves around within a mixed reality environment, virtual objects may be repositioned relative to the positions of each user.

Figure 2:
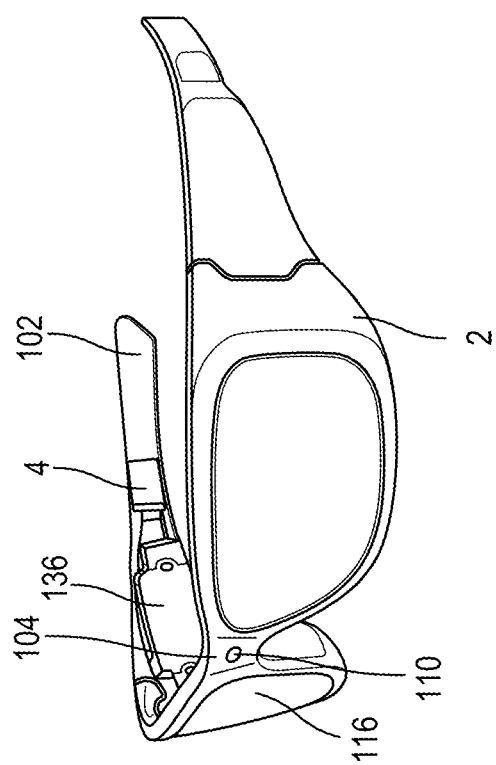
FIG. 2 is a perspective view of one embodiment of a head mounted display unit.
Figure 3:
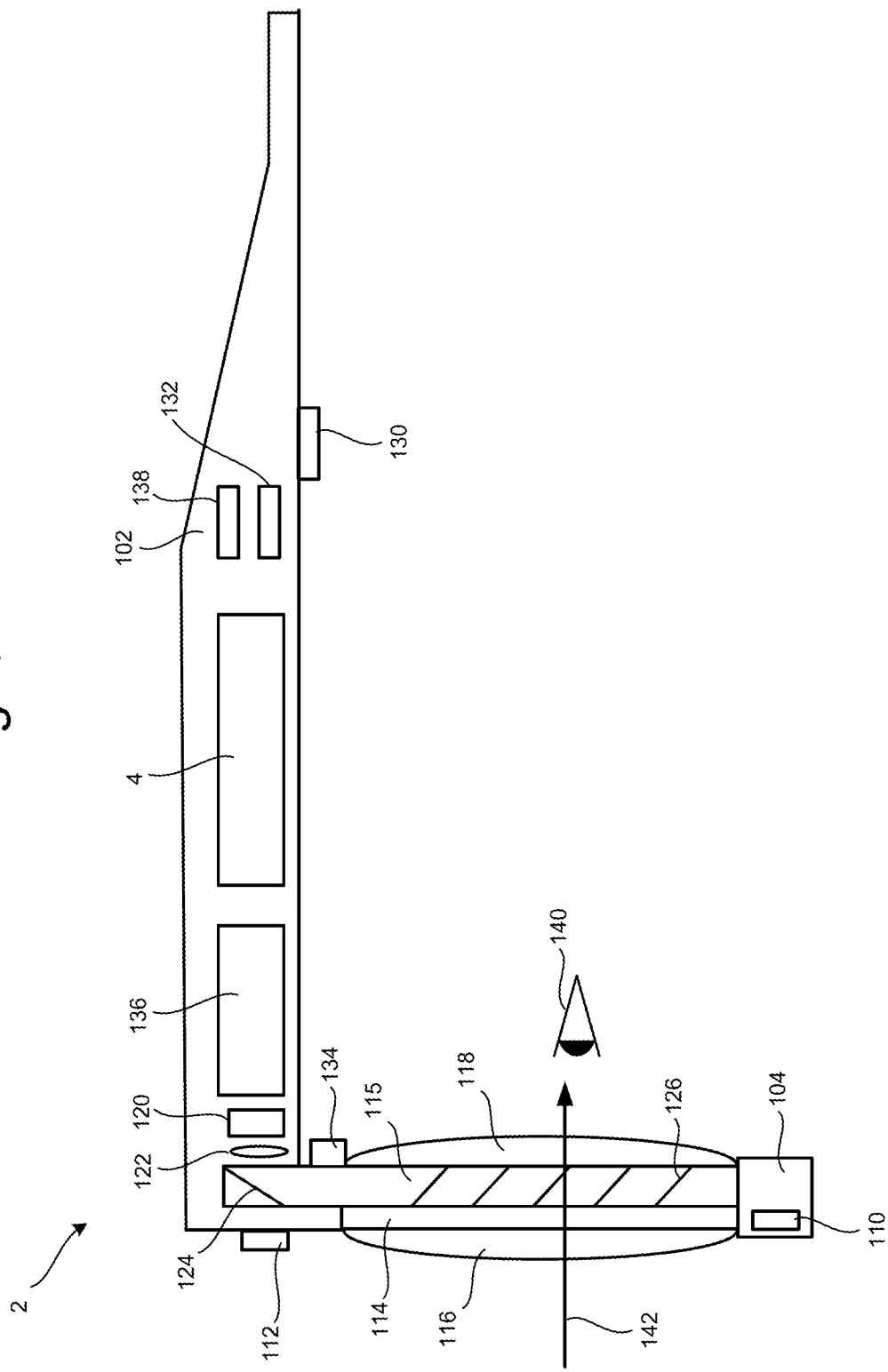
FIG. 3 is a side view of a portion of one embodiment of a head mounted display unit.

FIG. 1A illustrates a system 10 for providing a mixed reality experience by fusing virtual image 21 with real content within a user's FOV. FIG. 1 shows a single user 18 wearing a head mounted display device 2, but it is understood that more than one user may be present in the mixed reality environment and viewing the same virtual objects from their own perspective. As seen in FIGS. 2 and 3, a head mounted display device 2 may include an integrated processing unit 4. In other embodiments, the processing unit 4 may be separate from the head mounted display device 2, and may communicate with the head mounted display device 2 via wired or wireless communication.

Head mounted display device 2, which in one embodiment is in the shape of glasses, is worn on the head of a user so that the user can see through a display and thereby have an actual direct view of the space in front of the user. The use of the term "actual direct view" refers to the ability to see the real world objects directly with the human eye, rather than seeing created image representations of the objects. For example, looking through glass at a room allows a user to have an actual direct view of the room, while viewing a video of a room on a television is not an actual direct view of the room. More details of the head mounted display device 2 are provided below.

The processing unit 4 may include much of the computing power used to operate head mounted display device 2. In embodiments, the processing unit 4 communicates wirelessly (e.g., WiFi, Bluetooth, infra-red, or other wireless communication means) to one or more hub computing systems 12. As explained hereinafter, hub computing system 12 may be provided remotely from the processing unit 4, so that the hub computing system 12 and processing unit 4 communicate via a wireless network such as a LAN or WAN. In further embodiments, the hub computing system 12 may be omitted to provide a mobile mixed reality experience using the head mounted display devices 2 and processing units 4.

Hub computing system 12 may be a computer, a gaming system or console, or the like. According to an example embodiment, the hub computing system 12 may include hardware components and/or software components such that hub computing system 12 may be used to execute applications such as gaming applications, non-gaming applications, or the like. In one embodiment, hub computing system 12 may include a processor such as a standardized processor, a specialized processor, a microprocessor, or the like that may execute instructions stored on a processor readable storage device for performing the processes described herein.

Hub computing system 12 further includes a capture device 20 for capturing image data from portions of a scene within its FOV. As used herein, a scene is the environment in which the users move around, which environment is captured within the FOV of the capture device 20 and/or the FOV of each head mounted display device 2. FIG. 1A shows a single capture device 20, but there may be multiple capture devices in further embodiments which cooperate to collectively capture image data from a scene within the composite FOVs of the multiple capture devices 20. Capture device 20 may include one or more cameras that visually monitor the user 18 and the surrounding space such that gestures and/or movements performed by the user, as well as the structure of the surrounding space, may be captured, analyzed, and tracked to perform one or more controls or actions within the application and/or animate an avatar or on-screen character.

Hub computing system 12 may be connected to an audiovisual device 16 such as a television, a monitor, a high-definition television (HDTV), or the like that may provide game or application visuals. In one example, audiovisual device 16 includes internal speakers. In other embodiments, audiovisual device 16 and hub computing system 12 may be connected to external speakers 22.

The hub computing system 12, together with the head mounted display device 2 and processing unit 4, may provide a mixed reality experience where one or more virtual images, such as virtual image 21 in FIG. 1, may be mixed together with real world objects in a scene. FIG. 1 illustrates examples of a plant 23 or a user's hand 23 as real world objects appearing within the user's FOV.

Figure 1B:
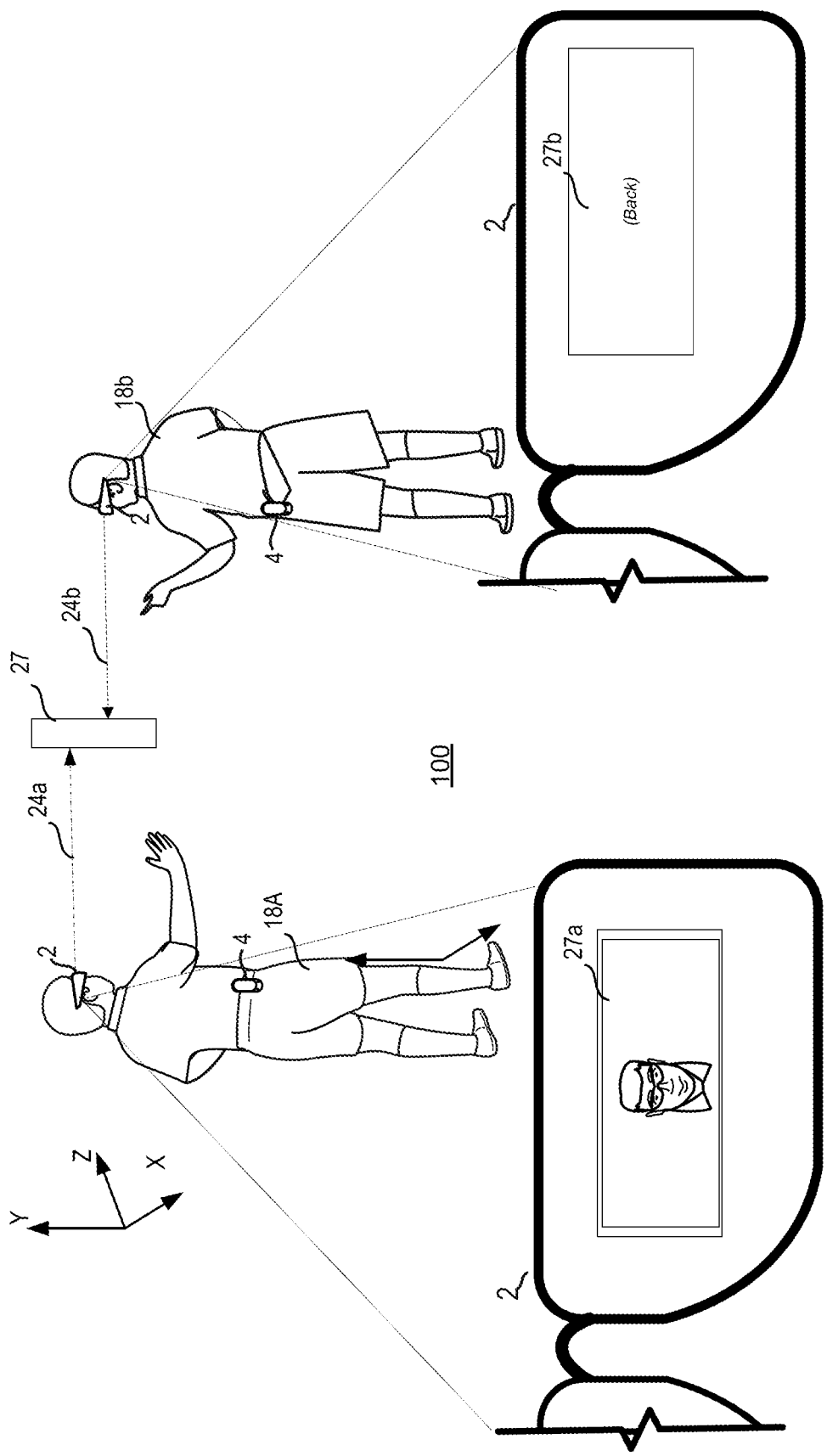
FIG. 1B is a depiction of two users, both wearing head mounted displays, sharing and viewing a common virtual object.

FIGS. 1B and 1C illustrate the present technology for positioning a virtual object for multiple users. FIG. 1B illustrates a user-centric perspective of a virtual object 27 between two users 18A and 18B in a common environment 100.

Each user may be equipped with a display device 2 and processing unit 4. Each user has their own perspective virtual object 27. User 18a has a perspective 24a while user 18b has a perspective 24b. Virtual object 27 has a front face 27a and a back face 27b. The view shown in FIG. 1B is user-centric to user 18a. User 18a has a view of the front 27a of the virtual object 27 while user 18b has a view of the back of the object 27b.

In the situation where users 18a and 18b are viewing a picture such as that shown in FIG. 1B, it is difficult for the users to share the experience picture when the user-centric view is used. The view in FIG. 1B is referred to as user-centric, because the view of the user 18 is better than that of user 18b with respect to the virtual object 27.

FIG. 1C shows a common or optimally viewed positioning of the virtual object 27 with respect to users 18*a* and 18*b*. The new location of the virtual object 27 is rendered relative to users 18*a* and 18*b* so that each perspective 24*a* and 24*b* is optimized for the user relative to the position of the user. When one user points to the virtual object 27, the position of the object an the direction of the user's pointing will appear correctly to user 18*b*.

The present technology provides determining a common view of a virtual object relative to two more users. In FIG. 1C, it should be understood that the virtual object 27 now has a common position, but the view of each user is relative—each "sees" the position of the virtual object in a common location in the environment, but each user 18A and 18*b* has a different perspective relative to that user.

FIGS. 2 and 3 show perspective and side views of the head mounted display device 2. FIG. 3 shows the right side of head mounted display device 2, including a portion of the device having temple 102 and nose bridge 104. Built into nose bridge 104 is a microphone 110 for recording sounds and transmitting that audio data to processing unit 4, as described below. At the front of head mounted display device 2 is room-facing video camera 112 that can capture video and still images. Those images are transmitted to processing unit 4, as described below.

A portion of the frame of head mounted display device 2 will surround a display (that includes one or more lenses). In order to show the components of head mounted display device 2, a portion of the frame surrounding the display is not depicted. The display includes a light-guide optical element 115, opacity filter 114, see-through lens 116 and see-through lens 118. In one embodiment, opacity filter 114 is behind and aligned with see-through lens 116, light-guide optical element 115 is behind and aligned with opacity filter 114, and see-through lens 118 is behind and aligned with light-guide optical element 115. See-through lenses 116 and 118 are standard lenses used in eye glasses and can be made to any prescription (including no prescription). Light-guide optical element 115 channels artificial light to the eye. More details of opacity filter 114 and light-guide optical element 115 are provided in U.S. Published Patent Application No. 2012/0127284, entitled, "Head-Mounted Display Device Which Provides Surround Video," which application published on May 24, 2012.

Control circuits 136 provide various electronics that support the other components of head mounted display device 2. More details of control circuits 136 are provided below with respect to FIG. 4. Inside or mounted to temple 102 are ear phones 130, inertial measurement unit 132 and temperature sensor 138. In one embodiment shown in FIG. 4, the inertial measurement unit 132 (or IMU 132) includes inertial sensors such as a three axis magnetometer 132A, three axis gyro 132B and three axis accelerometer 132C. The inertial measurement unit 132 senses position, orientation, and sudden accelerations (pitch, roll and yaw) of head mounted display device 2. The IMU 132 may include other inertial sensors in addition to or instead of magnetometer 132A, gyro 132B and accelerometer 132C.

Microdisplay 120 projects an image through lens 122. There are different image generation technologies that can be used to implement microdisplay 120. For example, microdisplay 120 can be implemented in using a transmissive projection technology where the light source is modulated by optically active material, backlit with white light. These technologies are usually implemented using LCD type displays with powerful backlights and high optical energy densities. Microdisplay 120 can also be implemented using a reflective technology for which external light is reflected and modulated by an optically active material. The illumination is forward lit by either a white source or RGB source, depending on the technology. Digital light processing (DLP), liquid crystal on silicon (LCOS) and Mirasol® display technology from Qualcomm, Inc. are all examples of reflective technologies which are efficient as most energy is reflected away from the modulated structure and may be used in the present system. Additionally, microdisplay 120 can be implemented using an emissive technology where light is generated by the display. For example, a PicoP™ display engine from Microvision, Inc. emits a laser signal with a micro mirror steering either onto a tiny screen that acts as a transmissive element or beamed directly into the eye (e.g., laser).

Light-guide optical element 115 transmits light from microdisplay 120 to the eye 140 of the user wearing head mounted display device 2. Light-guide optical element 115 also allows light from in front of the head mounted display device 2 to be transmitted through light-guide optical element 115 to eye 140, as depicted by arrow 142, thereby allowing the user to have an actual direct view of the space in front of head mounted display device 2 in addition to receiving a virtual image from microdisplay 120. Thus, the walls of light-guide optical element 115 are see-through. Light-guide optical element 115 includes a first reflecting surface 124 (e.g., a mirror or other surface). Light from microdisplay 120 passes through lens 122 and becomes incident on reflecting surface 124. The reflecting surface 124 reflects the incident light from the microdisplay 120 such that light is trapped inside a planar substrate comprising light-guide optical element 115 by internal reflection. After several reflections off the surfaces of the substrate, the trapped light waves reach an array of selectively reflecting surfaces 126. Note that one of the five surfaces is labeled 126 to prevent over-crowding of the drawing. Reflecting surfaces 126 couple the light waves incident upon those reflecting surfaces out of the substrate into the eye 140 of the user. More details of a light-guide optical element can be found in United States Patent Publication No. 2008/0285140, entitled "Substrate-Guided Optical Devices," published on Nov. 20, 2008.

Figure 4:
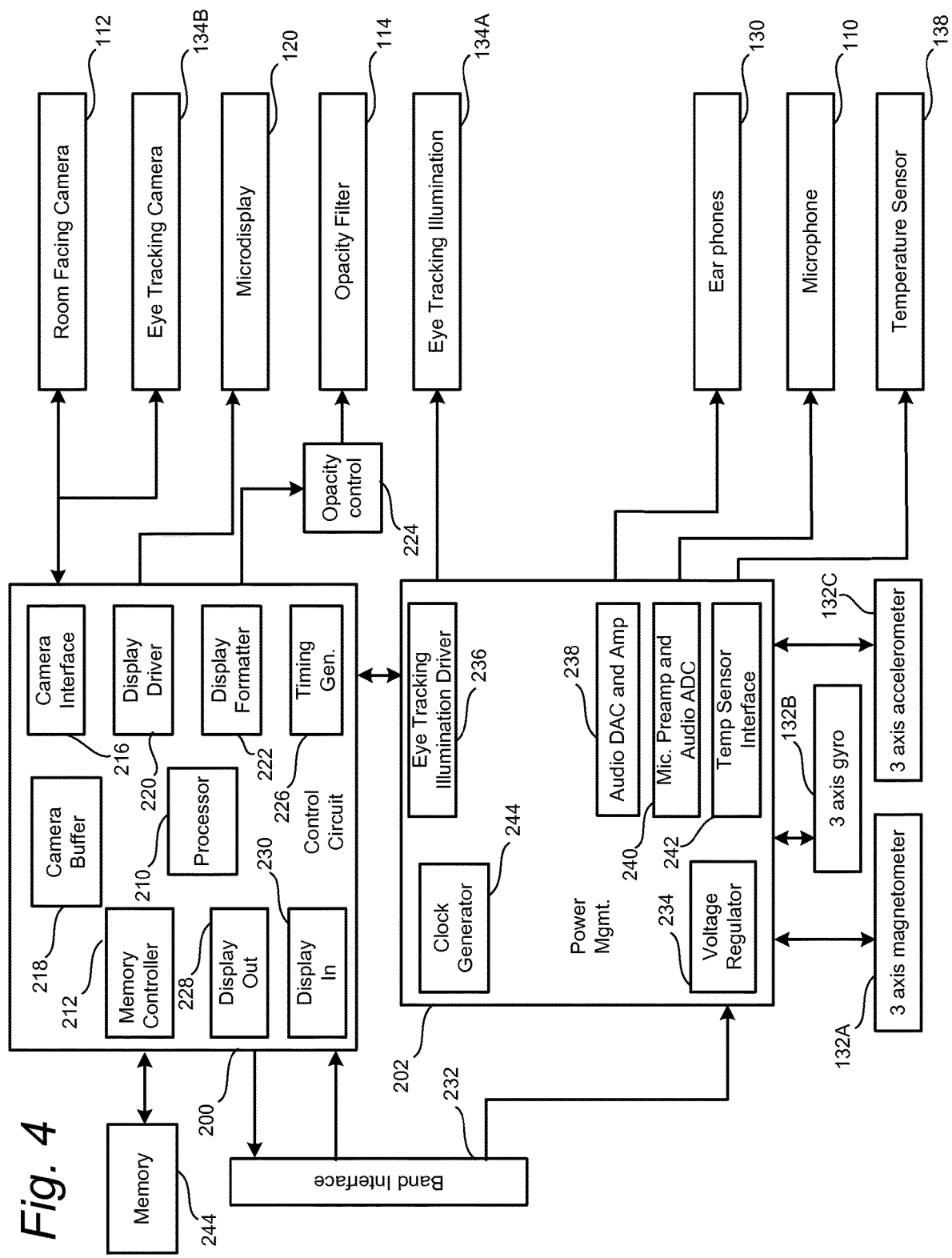
FIG. 4 is a block diagram of one embodiment of the components of a head mounted display unit.

Head mounted display device 2 also includes a system for tracking the position of the user's eyes. As will be explained below, the system will track the user's position and orientation so that the system can determine the FOV of the user. However, a human will not perceive everything in front of them. Instead, a user's eyes will be directed at a subset of the environment. Therefore, in one embodiment, the system will include technology for tracking the position of the user's eyes in order to refine the measurement of the FOV of the user. For example, head mounted display device 2 includes eye tracking assembly 134 (FIG. 3), which has an eye tracking illumination device 134A and eye tracking camera 134B (FIG. 4). In one embodiment, eye tracking illumination device 134A includes one or more infrared (IR) emitters, which emit IR light toward the eye. Eye tracking camera 134B includes one or more cameras that sense the reflected IR light. The position of the pupil can be identified by known imaging techniques which detect the reflection of the cornea. For example, see U.S. Pat. No. 7,401,920, entitled "Head Mounted Eye Tracking and Display System", issued Jul. 22, 2008. Such a technique can locate a position of the center of the eye relative to the tracking camera. Generally, eye tracking involves obtaining an image of the eye and using computer vision techniques to determine the location of the pupil within the eye socket. In one embodiment, it is sufficient to track the location of one eye since the eyes usually move in unison. However, it is possible to track each eye separately.

In one embodiment, the system will use four IR LEDs and four IR photo detectors in rectangular arrangement so that there is one IR LED and IR photo detector at each corner of the lens of head mounted display device 2. Light from the LEDs reflect off the eyes. The amount of infrared light detected at each of the four IR photo detectors determines the pupil direction. That is, the amount of white versus black in the eye will determine the amount of light reflected off the eye for that particular photo detector. Thus, the photo detector will have a measure of the amount of white or black in the eye. From the four samples, the system can determine the direction of the eye.

Another alternative is to use four infrared LEDs as discussed above, but one infrared CCD on the side of the lens of head mounted display device 2. The CCD will use a small mirror and/or lens (fish eye) such that the CCD can image up to 75% of the visible eye from the glasses frame. The CCD will then sense an image and use computer vision to find the image, much like as discussed above. Thus, although FIG. 3 shows one assembly with one IR transmitter, the structure of FIG. 3 can be adjusted to have four IR transmitters and/or four IR sensors. More or less than four IR transmitters and/or four IR sensors can also be used.

Another embodiment for tracking the direction of the eyes is based on charge tracking. This concept is based on the observation that a retina carries a measurable positive charge and the cornea has a negative charge. Sensors are mounted by the user's ears (near earphones 130) to detect the electrical potential while the eyes move around and effectively read out what the eyes are doing in real time. Other embodiments for tracking eyes can also be used.

FIG. 3 shows half of the head mounted display device 2. A full head mounted display device would include another set of see-through lenses, another opacity filter, another light-guide optical element, another microdisplay 120, another lens 122, room-facing camera, eye tracking assembly, micro display, earphones, and temperature sensor.

Figure 5:
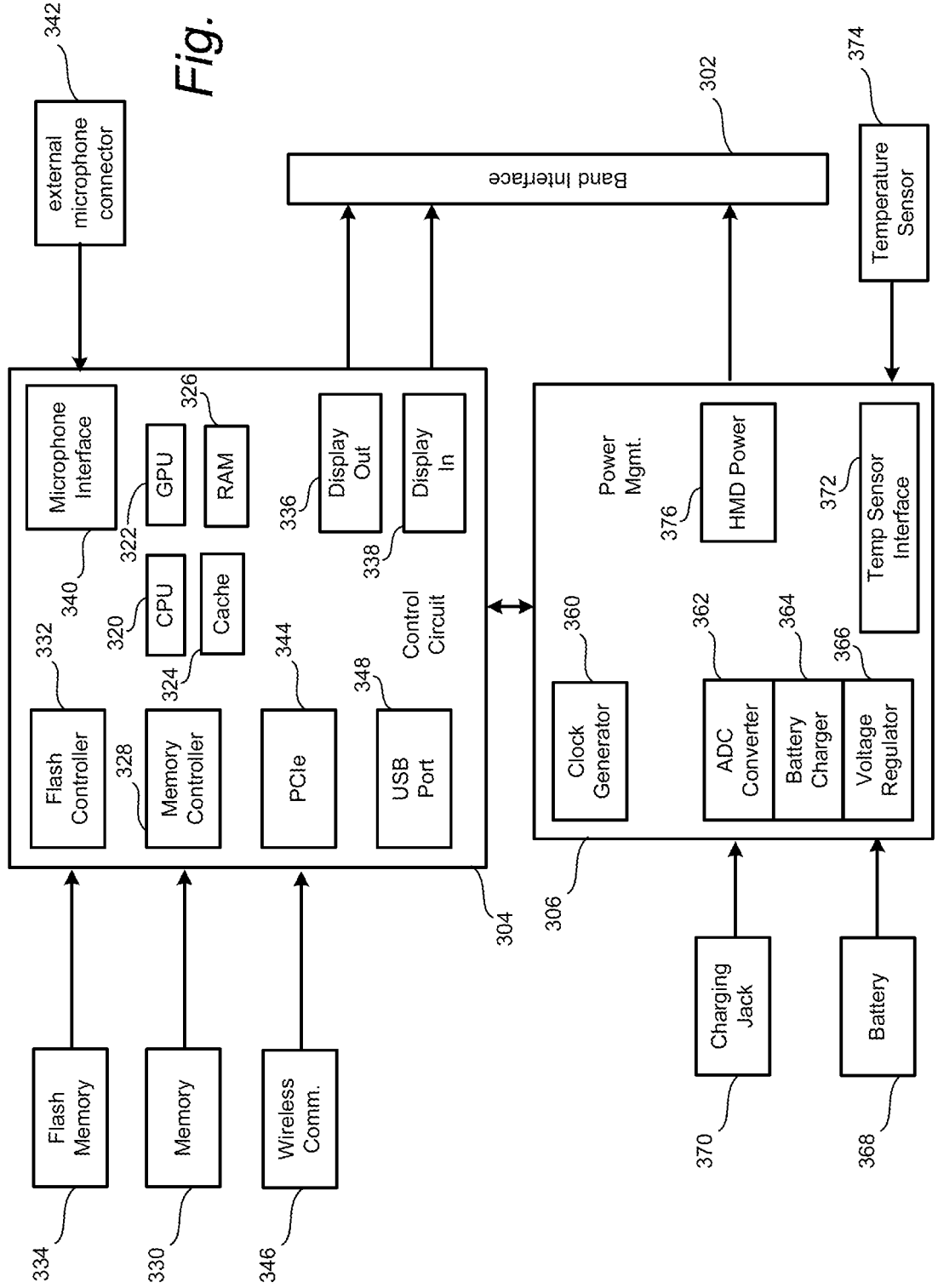
FIG. 5 is a block diagram of one embodiment of the components of a processing unit associated with a head mounted display unit.

FIG. 4 is a block diagram depicting the various components of head mounted display device 2. FIG. 5 is a block diagram describing the various components of processing unit 4. Head mounted display device 2, the components of which are depicted in FIG. 4, is used to provide a mixed reality experience to the user by fusing one or more virtual images seamlessly with the user's view of the real world. Additionally, the head mounted display device components of FIG. 4 include many sensors that track various conditions. Head mounted display device 2 will receive instructions about the virtual image from processing unit 4 and will provide the sensor information back to processing unit 4. Processing unit 4, the components of which are depicted in FIG. 4, will receive the sensory information from head mounted display device 2 and will exchange information and data with the hub computing system 12 (FIG. 1A). Based on that exchange of information and data, processing unit 4 will determine where and when to provide a virtual image to the user and send instructions accordingly to the head mounted display device of FIG. 4.

Some of the components of FIG. 4 (e.g., room-facing camera 112, eye tracking camera 134B, microdisplay 120, opacity filter 114, eye tracking illumination 134A, earphones 130, and temperature sensor 138) are shown in shadow to indicate that there are two of each of those devices, one for the left side and one for the right side of head mounted display device 2. FIG. 4 shows the control circuit 200 in communication with the power management circuit 202. Control circuit 200 includes processor 210, memory controller 212 in communication with memory 214 (e.g., D-RAM), camera interface 216, camera buffer 218, display driver 220, display formatter 222, timing generator 226, display out interface 228, and display in interface 230.

In one embodiment, all of the components of control circuit 200 are in communication with each other via dedicated lines or one or more buses. In another embodiment, each of the components of control circuit 200 is in communication with processor 210. Camera interface 216 provides an interface to the two room-facing cameras 112 and stores images received from the room-facing cameras in camera buffer 218. Display driver 220 will drive microdisplay 120. Display formatter 222 provides information, about the virtual image being displayed on microdisplay 120, to opacity control circuit 224, which controls opacity filter 114. Timing generator 226 is used to provide timing data for the system. Display out interface 228 is a buffer for providing images from room-facing cameras 112 to the processing unit 4. Display in interface 230 is a buffer for receiving images such as a virtual image to be displayed on microdisplay 120. Display out interface 228 and display in interface 230 communicate with band interface 232 which is an interface to processing unit 4.

Power management circuit 202 includes voltage regulator 234, eye tracking illumination driver 236, audio DAC and amplifier 238, microphone preamplifier and audio ADC 240, temperature sensor interface 242 and clock generator 244. Voltage regulator 234 receives power from processing unit 4 via band interface 232 and provides that power to the other components of head mounted display device 2. Eye tracking illumination driver 236 provides the IR light source for eye tracking illumination 134A, as described above. Audio DAC and amplifier 238 output audio information to the earphones 130. Microphone preamplifier and audio ADC 240 provides an interface for microphone 110. Temperature sensor interface 242 is an interface for temperature sensor 138. Power management circuit 202 also provides power and receives data back from three axis magnetometer 132A, three axis gyro 132B and three axis accelerometer 132C.

FIG. 5 is a block diagram describing the various components of processing unit 4. FIG. 5 shows control circuit 304 in communication with power management circuit 306. Control circuit 304 includes a central processing unit (CPU) 320, graphics processing unit (GPU) 322, cache 324, RAM 326, memory controller 328 in communication with memory 330 (e.g., D-RAM), flash memory controller 332 in communication with flash memory 334 (or other type of non-volatile storage), display out buffer 336 in communication with head mounted display device 2 via band interface 302 and band interface 232, display in buffer 338 in communication with head mounted display device 2 via band interface 302 and band interface 232, microphone interface 340 in communication with an external microphone connector 342 for connecting to a microphone, PCI express interface for connecting to a wireless communication device 346, and USB port(s) 348. In one embodiment, wireless communication device 346 can include a Wi-Fi enabled communication device, BlueTooth communication device, infrared communication device, etc. The USB port can be used to dock the processing unit 4 to hub computing system 12 in order to load data or software onto processing unit 4, as well as charge processing unit 4. In one embodiment, CPU 320 and GPU 322 are the main workhorses for determining where, when and how to insert virtual three-dimensional objects into the view of the user. More details are provided below.

Power management circuit 306 includes clock generator 360, analog to digital converter 362, battery charger 364, voltage regulator 366, head mounted display power source 376, and temperature sensor interface 372 in communication with temperature sensor 374 (possibly located on the wrist band of processing unit 4). Analog to digital converter 362 is used to monitor the battery voltage, the temperature sensor and control the battery charging function. Voltage regulator 366 is in communication with battery 368 for supplying power to the system. Battery charger 364 is used to charge battery 368 (via voltage regulator 366) upon receiving power from charging jack 370. HMD power source 376 provides power to the head mounted display device 2.

Figure 6:
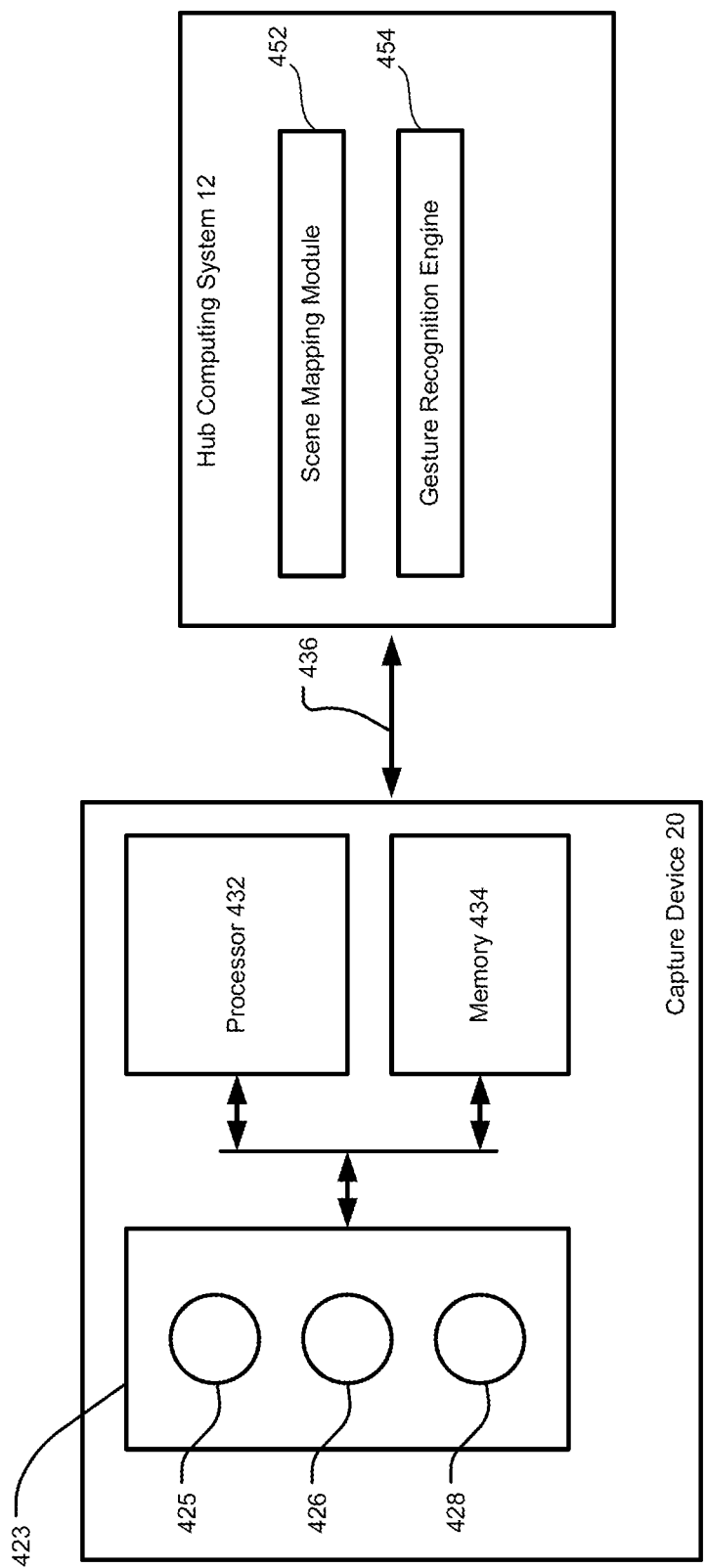
FIG. 6 is a block diagram of one embodiment of the components of a hub computing system used with head mounted display unit.

FIG. 6 illustrates an example embodiment of hub computing system 12 with a capture device 20. According to an example embodiment, capture device 20 may be configured to capture video with depth information including a depth image that may include depth values via any suitable technique including, for example, time-of-flight, structured light, stereo image, or the like. According to one embodiment, the capture device 20 may organize the depth information into "Z layers," or layers that may be perpendicular to a Z axis extending from the depth camera along its line of sight.

As shown in FIG. 6, capture device 20 may include a camera component 423. According to an example embodiment, camera component 423 may be or may include a depth camera that may capture a depth image of a scene. The depth image may include a two-dimensional (2-D) pixel area of the captured scene where each pixel in the 2-D pixel area may represent a depth value such as a distance in, for example, centimeters, millimeters, or the like of an object in the captured scene from the camera.

Camera component 423 may include an infra-red (IR) light component 425, a three-dimensional (3-D) camera 426, and an RGB (visual image) camera 428 that may be used to capture the depth image of a scene. For example, in time-of-flight analysis, the IR light component 425 of the capture device 20 may emit an infrared light onto the scene and may then use sensors (in some embodiments, including sensors not shown) to detect the backscattered light from the surface of one or more targets and objects in the scene using, for example, the 3-D camera 426 and/or the RGB camera 428.

In an example embodiment, the capture device 20 may further include a processor 432 that may be in communication with the image camera component 423. Processor 432 may include a standardized processor, a specialized processor, a microprocessor, or the like that may execute instructions including, for example, instructions for receiving a depth image, generating the appropriate data format (e.g., frame) and transmitting the data to hub computing system 12.

Capture device 20 may further include a memory 434 that may store the instructions that are executed by processor 432, images or frames of images captured by the 3-D camera and/or RGB camera, or any other suitable information, images, or the like. According to an example embodiment, memory 434 may include random access memory (RAM), read only memory (ROM), cache, flash memory, a hard disk, or any other suitable storage component. As shown in FIG. 6, in one embodiment, memory 434 may be a separate component in communication with the image camera component 423 and processor 432. According to another embodiment, the memory 434 may be integrated into processor 432 and/or the image camera component 423.

Capture device 20 is in communication with hub computing system 12 via a communication link 436. The communication link 436 may be a wired connection including, for example, a USB connection, a Firewire connection, an Ethernet cable connection, or the like and/or a wireless connection such as a wireless 802.11B, g, a, or n connection. According to one embodiment, hub computing system 12 may provide a clock to capture device 20 that may be used to determine when to capture, for example, a scene via the communication link 436. Additionally, the capture device 20 provides the depth information and visual (e.g., RGB) images captured by, for example, the 3-D camera 426 and/or the RGB camera 428 to hub computing system 12 via the communication link 436. In one embodiment, the depth images and visual images are transmitted at 30 frames per second; however, other frame rates can be used. Hub computing system 12 may then create and use a model, depth information, and captured images to, for example, control an application such as a game or word processor and/or animate an avatar or on-screen character.

The above-described hub computing system 12, together with the head mounted display device 2 and processing unit 4, are able to insert a virtual three-dimensional object into the FOV of one or more users so that the virtual three-dimensional object augments and/or replaces the view of the real world. In one embodiment, head mounted display device 2, processing unit 4 and hub computing system 12 work together as each of the devices includes a subset of sensors that are used to obtain the data to determine where, when and how to insert the virtual three-dimensional object. In one embodiment, the calculations that determine where, when and how to insert a virtual three-dimensional object are performed by the hub computing system 12 and processing unit 4 working in tandem with each other. However, in further embodiments, all calculations may be performed by the hub computing system 12 working alone or the processing unit(s) 4 working alone. In other embodiments, at least some of the calculations can be performed by the head mounted display device 2.

In one example embodiment, hub computing system 12 and processing units 4 work together to create the scene map or model of the environment that the one or more users are in and track various moving objects in that environment. In addition, hub computing system 12 and/or processing unit 4 track the FOV of a head mounted display device 2 worn by a user 18 by tracking the position and orientation of the head mounted display device 2. Sensor information obtained by head mounted display device 2 is transmitted to processing unit 4. In one example, that information is transmitted to the hub computing system 12 which updates the scene model and transmits it back to the processing unit. The processing unit 4 then uses additional sensor information it receives from head mounted display device 2 to refine the FOV of the user and provide instructions to head mounted display device 2 on where, when and how to insert the virtual three-dimensional object. Based on sensor information from cameras in the capture device 20 and head mounted display device(s) 2, the scene model and the tracking information may be periodically updated between hub computing system 12 and processing unit 4 in a closed loop feedback system as explained below.

Figure 7:
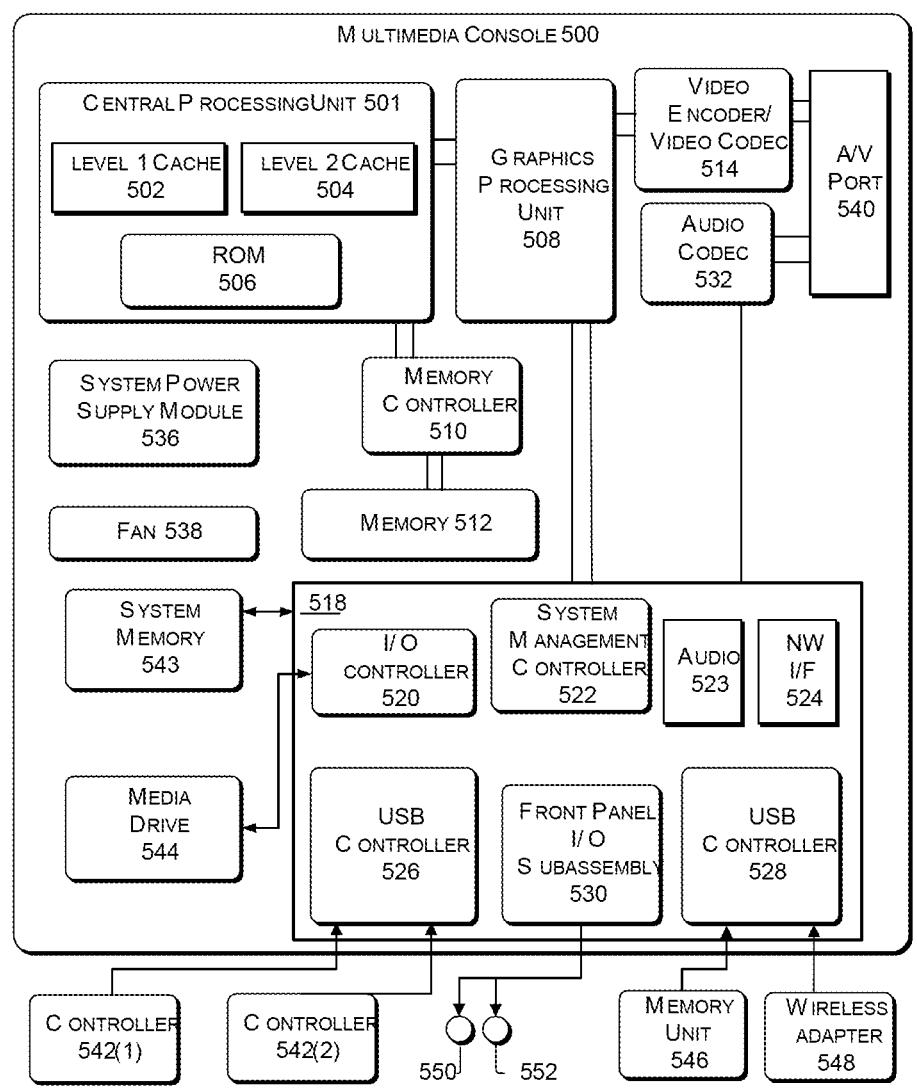
FIG. 7 is a block diagram of one embodiment of a computing system that can be used to implement the hub computing system described herein.

FIG. 7 illustrates an example embodiment of a computing system that may be used to implement hub computing system 12. As shown in FIG. 7, the multimedia console 500 has a central processing unit (CPU) 501 having a level 1 cache 502, a level 2 cache 504, and a flash ROM (Read Only Memory) 506. The level 1 cache 502 and a level 2 cache 504 temporarily store data and hence reduce the number of memory access cycles, thereby improving processing speed and throughput. CPU 501 may be provided having more than one core, and thus, additional level 1 and level 2 caches 502 and 504. The flash ROM 506 may store executable code that is loaded during an initial phase of a boot process when the multimedia console 500 is powered on.

A graphics processing unit (GPU) 508 and a video encoder/video codec (coder/decoder) 514 form a video processing pipeline for high speed and high resolution graphics processing. Data is carried from the graphics processing unit 508 to the video encoder/video codec 514 via a bus. The video processing pipeline outputs data to an A/V (audio/video) port 540 for transmission to a television or other display. A memory controller 510 is connected to the GPU 508 to facilitate processor access to various types of memory 512, such as, but not limited to, a RAM (Random Access Memory).

The multimedia console 500 includes an I/O controller 520, a system management controller 522, an audio processing unit 523, a network interface 524, a first USB host controller 526, a second USB controller 528 and a front panel I/O subassembly 530 that are preferably implemented on a module 518. The USB controllers 526 and 528 serve as hosts for peripheral controllers 542(1)-542(2), a wireless adapter 548, and an external memory device 546 (e.g., flash memory, external CD/DVD ROM drive, removable media, etc.). The network interface 524 and/or wireless adapter 548 provide access to a network (e.g., the Internet, home network, etc.) and may be any of a wide variety of various wired or wireless adapter components including an Ethernet card, a modem, a Bluetooth module, a cable modem, and the like.

System memory 543 is provided to store application data that is loaded during the boot process. A media drive 544 is provided and may comprise a DVD/CD drive, Blu-Ray drive, hard disk drive, or other removable media drive, etc. The media drive 544 may be internal or external to the multimedia console 500. Application data may be accessed via the media drive 544 for execution, playback, etc. by the multimedia console 500. The media drive 544 is connected to the I/O controller 520 via a bus, such as a Serial ATA bus or other high speed connection (e.g., IEEE 1394).

The system management controller 522 provides a variety of service functions related to assuring availability of the multimedia console 500. The audio processing unit 523 and an audio codec 532 form a corresponding audio processing pipeline with high fidelity and stereo processing. Audio data is carried between the audio processing unit 523 and the audio codec 532 via a communication link. The audio processing pipeline outputs data to the NV port 540 for reproduction by an external audio user or device having audio capabilities.

The front panel I/O subassembly 530 supports the functionality of the power button 550 and the eject button 552, as well as any LEDs (light emitting diodes) or other indicators exposed on the outer surface of the multimedia console 500. A system power supply module 536 provides power to the components of the multimedia console 500. A fan 538 cools the circuitry within the multimedia console 500.

The CPU 501, GPU 508, memory controller 510, and various other components within the multimedia console 500 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 500 is powered on, application data may be loaded from the system memory 543 into memory 512 and/or caches 502, 504 and executed on the CPU 501. The application may present a graphical user interface that provides a consistent user experience when navigating to different media types available on the multimedia console 500. In operation, applications and/or other media contained within the media drive 544 may be launched or played from the media drive 544 to provide additional functionalities to the multimedia console 500.

The multimedia console 500 may be operated as a standalone system by simply connecting the system to a television or other display. In this standalone mode, the multimedia console 500 allows one or more users to interact with the system, watch movies, or listen to music. However, with the integration of broadband connectivity made available through the network interface 524 or the wireless adapter 548, the multimedia console 500 may further be operated as a participant in a larger network community. Additionally, multimedia console 500 can communicate with processing unit 4 via wireless adaptor 548.

Optional input devices (e.g., controllers 542(1) and 542(2)) are shared by gaming applications and system applications. The input devices are not reserved resources, but are to be switched between system applications and the gaming application such that each will have a focus of the device. The application manager preferably controls the switching of input stream, without knowing the gaming application's knowledge and a driver maintains state information regarding focus switches. Capture device 20 may define additional input devices for the console 500 via USB controller 526 or other interface. In other embodiments, hub computing system 12 can be implemented using other hardware architectures. No one hardware architecture is required.

The head mounted display device 2 and processing unit 4 (collectively referred to at times as the mobile display device) shown in FIG. 1 are in communication with one hub computing system 12 (also referred to as the hub 12). There may be one or two or more mobile display devices in communication with the hub 12 in further embodiments. Each of the mobile display devices may communicate with the hub using wireless communication, as described above. In such an embodiment, it is contemplated that much of the information that is useful to the mobile display devices will be computed and stored at the hub and transmitted to each of the mobile display devices. For example, the hub will generate the model of the environment and provide that model to all of the mobile display devices in communication with the hub. Additionally, the hub can track the location and orientation of the mobile display devices and of the moving objects in the room, and then transfer that information to each of the mobile display devices.

In another embodiment, a system could include multiple hubs 12, with each hub including one or more mobile display devices. The hubs can communicate with each other directly or via the Internet (or other networks). Such an embodiment is disclosed in U.S. patent application Ser. No. 12/905,952 to Flaks et al., entitled "Fusing Virtual Content Into Real Content," filed Oct. 15, 2010.

Moreover, in further embodiments, the hub 12 may be omitted altogether. One benefit of such an embodiment is that the mixed reality experience of the present system becomes completely mobile, and may be used in both indoor or outdoor settings. In such an embodiment, all functions performed by the hub 12 in the description that follows may alternatively be performed by one of the processing units 4, some of the processing units 4 working in tandem, or all of the processing units 4 working in tandem. In such an embodiment, the respective mobile display devices 2 perform all functions of system 10, including generating and updating state data, a scene map, each user's view of the scene map, all texture and rendering information, video and audio data, and other information to perform the operations described herein. The embodiments described below with respect to the flowchart of FIG. 9 include a hub 12. However, in each such embodiment, one or more of the processing units 4 may alternatively perform all described functions of the hub 12.

Figure 8:
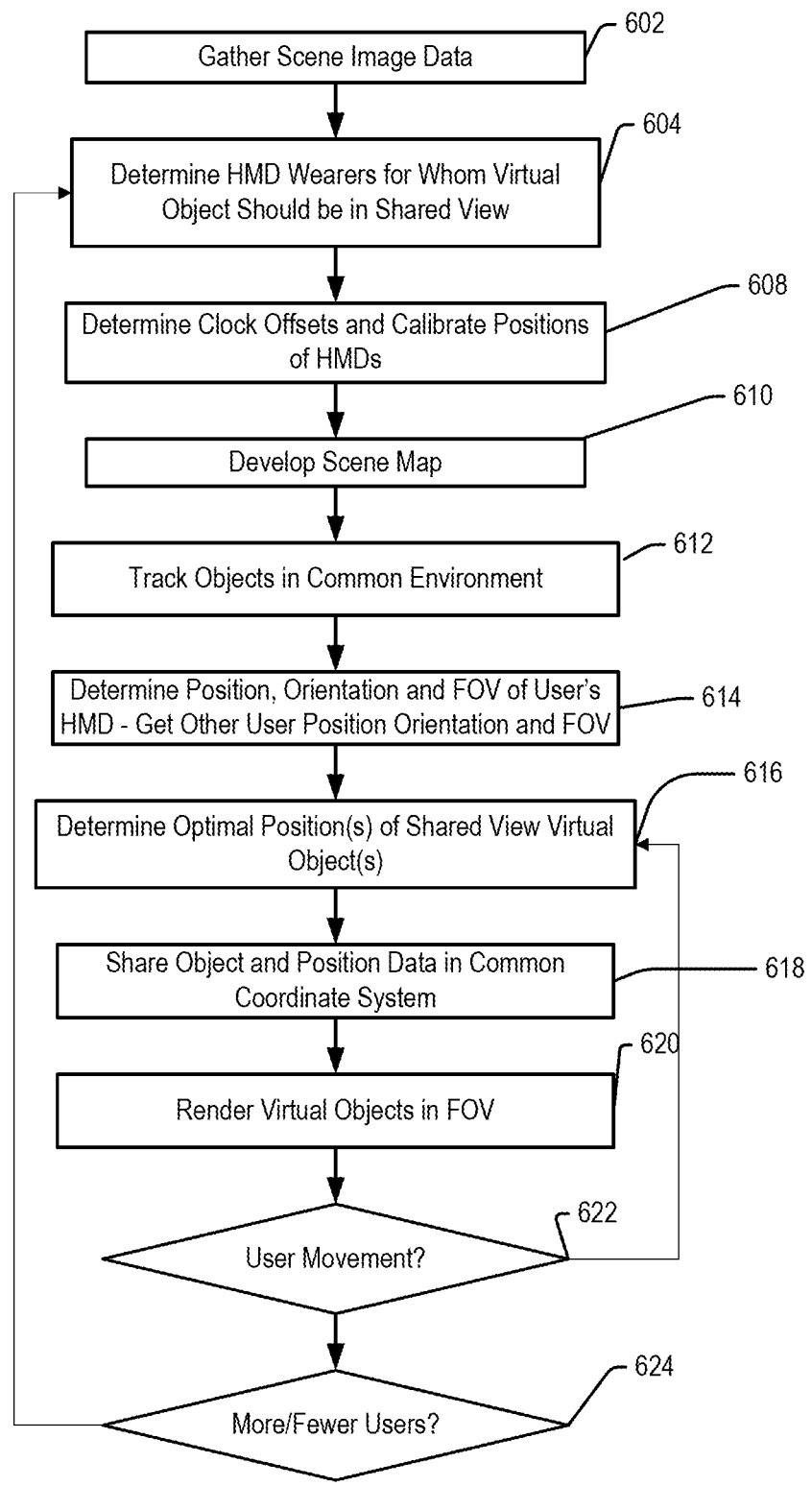
FIG. 8 is a flowchart representing a method in accordance with the present technology.

FIG. 8 is a flowchart illustrating a general method in accordance with the present technology. The method of FIG. 8 may be performed by components of the hub computing system 12, the processing unit 4 and/or head mounted display device 2 during a discrete time period such as the time it takes to generate, render and display a single frame of image data to each user. Any one or more of the hub computing system 12, the processing unit 4 and/or head mounted display device 2 acting alone or in conjunction with another of the systems may perform all or portions of the method.

In general, the system generates a scene map having x, y, z coordinates of the environment and objects in the environment such as users, real world objects and virtual objects. As noted above, the virtual object 27 may be virtually placed in the environment for example by an application running on the processing unit 4 and/or head mounted display device 2 or by user 18. The system also tracks the FOV of each user. While all users may be viewing the same aspects of the scene, they are viewing them from different perspectives.

The system for presenting mixed reality to one or more users 18 may be configured to allow a user 18, or the owner/operator of a common environment within which the users are both present, to view virtual objects at a common or optimal viewing location within the common environment.

With reference to FIG. 6, at step 602, scene data is gathered. For the hub 12, this may be image and audio data sensed by the depth camera 426 and RGB camera 428 of capture device 20. For the processing unit 4, this may be image data sensed by the head mounted display device 2, and in particular, by the cameras 112, the eye tracking assemblies 134 and the IMU 132.

At step 604, the HMD wearers with whom objects will be viewed in common are determined. The users allowed to view a commonly viewed virtual object may be everyone in a common environment or a defined set of users. For example, when a commonly viewed a virtual object is to be shared between users, sharing control of the object may be defined by a user (such as user 18a) or an owner of a common environment 100. For example, one user 18a may choose to share a picture or picture album in virtual object 27 with user 18b. In another example, common environment 100 may comprise a coffee shop and the owner of the environment may choose to share virtual objects with patrons of the coffee shop. In both cases, a virtual object definition for each object may include which users are allowed to view a virtual object as well positioning and orientation rules, object rendering information, and perspective information. This can entail determining perspectives, properties of the virtual device, and whether or not certain users are allowed to view the object. An illustration of permission settings for shared virtual objects can be found in U.S. patent application Ser. No. 13/464,941 entitled COLLABORATION ENVIRONMENT USING SEE THROUGH DISPLAYS.

In step 608, the positions of various HMDs in a common environment 100 are determined and the devices calibrated to a common local coordinate system. In general, it is possible that the head mounted display devices 2 coupled to users are moving around in the common environment. Therefore, in embodiments, the positions of each of the imaging cameras are calibrated to the environment and each other. Further details of step 608 are described U.S. Patent Publication No. 2012/0105473, entitled, "Low-Latency Fusing of Virtual And Real Content," published on May 3, 2012.

Once the system is calibrated in step 608, a scene map may be developed in step 610 identifying the geometry of the scene as well as the geometry and positions of objects within the scene. In embodiments, the scene map generated in a given frame may include the x, y and z positions in the local coordinate system of all users, real world objects and virtual objects in the common environment. The scene map may be used in positioning virtual objects within the scene, as well as displaying virtual three-dimensional objects with the proper occlusion (a virtual three-dimensional object may be occluded, or a virtual three-dimensional object may occlude, a real world object or another virtual three-dimensional object).

In step 612, the system may detect and track moving objects such as humans moving in the common environment, and update the scene map based on the positions of moving objects.

Figure 9:
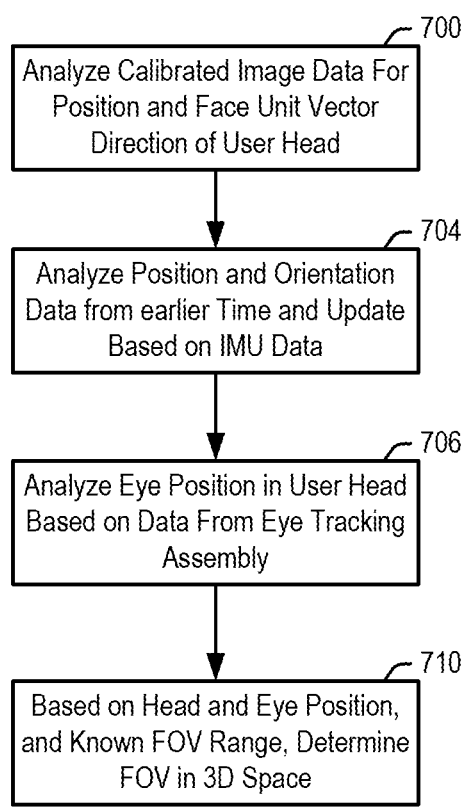
FIG. 9 is a depiction of the flowchart representing one method of implementing step 612 in FIG. 8.

In step 614, a determination of position, the orientation and the FOV of a first user's head mounted display device 2. Further details of step 614 are now described with respect to the flowchart of FIG. 9. The steps of FIG. 9 are described below with respect to a single user. However, the steps of FIG. 9 may be carried out for each user within the scene. As the position, orientation and FOV of other users is determined, this information may be retrieved to the device performing the method for use in determining the common/optimal viewing position of virtual objects.

At step 616, the optimal position and orientation for each commonly viewed virtual object to be rendered to users in an environment is determined. One method of determining the positions and orientation of common view virtual objects is illustrated in FIG. 10.

At 618, information concerning the virtual object to be commonly viewed is sent to all users in the common environment with whom the object is to be viewed. Such information may include the object definition (if the viewer's device does not have it) and the common/optimal position (and orientation) at which the object should be rendered. At 620 the object is rendered in each viewing user's HMD.

At step 622, if user movement relative to the virtual object is detected, the common/optimal viewing position and/or orientation of the object may be changed. User movement may comprise movement to manipulate the object, as discussed above, or movement within the common environment. For example, the commonly viewed virtual object may be a book, the user may act to turn the page of the book. As such, the method will return to step 616 make a determination of whether or not common view of the virtual object needs to change. Similarly, a user may physically move within the common environment and their position music relative to the virtual object may change. Again, the system will return to step 616 to determine whether or not the perspective view of the user needs to change.

If not, at step 624, a determination is made or not more or fewer users have entered or left the common environment. If so, the method returns to step 604 to determine changes in the scene can any changes in the virtual objects rendered in the common environment.

FIG. 9 illustrates one method for performing step 612 in FIG. 8. At step 700, the calibrated image data for the scene is analyzed to determine both the user head position and a face unit vector looking straight out from a user's face. The face unit vector (or perspective 24) may be determined by defining a plane of the user's face from a skeletal model of the user, and taking a vector perpendicular to that plane. This plane may be identified by determining a position of a user's eyes, nose, mouth, ears or other facial features. The face unit vector may be used to define the user's head orientation and, in examples, may be considered the center of the FOV for the user. The face unit vector may also or alternatively be identified from the camera image data returned from the cameras 112 on head mounted display device 2.

In step 704, the position and orientation of a user's head may also or alternatively be determined from analysis of the position and orientation of the user's head from an earlier time (either earlier in the frame or from a prior frame), and then using the inertial information from the IMU 132 to update the position and orientation of a user's head. Information from the IMU 132 may provide accurate kinematic data for a user's head, but the IMU typically does not provide absolute position information regarding a user's head. This absolute position information, also referred to as "ground truth," may be provided from the image data obtained from capture device 20, the cameras on the head mounted display device 2 for the subject user and/or from the head mounted display device(s) 2 of other users.

In embodiments, the position and orientation of a user's head may be determined by steps 700 and 704 acting in tandem. In further embodiments, one or the other of steps 700 and 704 may be used to determine head position and orientation of a user's head.

It may happen that a user is not looking straight ahead. Therefore, in addition to identifying user head position and orientation, the hub may further consider the position of the user's eyes in his head. This information may be provided by the eye tracking assembly 134 described above. The eye tracking assembly is able to identify a position of the user's eyes, which can be represented as an eye unit vector showing the left, right, up and/or down deviation from a position where the user's eyes are centered and looking straight ahead (i.e., the face unit vector). A face unit vector may be adjusted to the eye unit vector to define where the user is looking.

In step 710, the FOV of the user may next be determined. The range of view of a user of a head mounted display device 2 may be predefined based on the up, down, left and right peripheral vision of a hypothetical user. In order to ensure that the FOV calculated for a given user includes objects that a particular user may be able to see at the extents of the FOV, this hypothetical user may be taken as one having a maximum possible peripheral vision. Some predetermined extra FOV may be added to this to ensure that enough data is captured for a given user in embodiments.

The FOV for the user at a given instant may then be calculated by taking the range of view and centering it around the face unit vector, adjusted by any deviation of the eye unit vector. In addition to defining what a user is looking at in a given instant, this determination of a user's FOV is also useful for determining what a user cannot see. As explained below, limiting processing of virtual objects to those areas that a particular user can see improves processing speed and reduces latency.

In the embodiment described above, the hub 12 calculates the FOV of the one or more users in the scene. In further embodiments, the processing unit 4 for a user may share in this task. For example, once user head position and eye orientation are estimated, this information may be sent to the processing unit which can update the position, orientation, etc. based on more recent data as to head position (from IMU 132) and eye position (from eye tracking assembly 134).

FIG. 10 illustrates one method of determining a common/optimal position and orientation for a commonly viewed virtual object. At step 1020, for each commonly viewed object, a determination is made at step 1022 as to whether a user has exercised user control over the position or orientation of the object. User control at step 1022 may comprise positioning an object in the environment or may comprise a series of user preferences 1034 that are taken into account in the positioning of the object.

At 1024, the common/optimal object position and orientation is determined by reference to rules associated with the object which may be based on object type, object position, object orientation, the number of users and user position. Several examples in step 1024 are illustrated in FIGS. 11 through 14. In one embodiment, step 1024 is performed automatically for each common view object rendered where more than one user is viewing the object. In another embodiment, step 1024 is triggered at the request of a user sharing a common object, by, for example, a gesture or manipulation action on the common object indicating the user wishes the system to move the object to an optimal position.

At step 1030, a determination is made as to whether or not user manipulation of the virtual object has been received. This manipulation or control may be that which occurs at step 622 in FIG. 8. If a manipulation action is received, then the control action is identified at 1032. The control action may be a physical repositioning of the commonly viewed object or may comprise a control or manipulative gesture on the virtual object (such as, for example, turning a page of a book).

Information output to each users' HMD for virtual object is updated at 1038. In one aspect, this may comprise communicating new positioning information to other viewers of the common object or communicating a change to the virtual object form. The method repeats for each common view virtual object.

FIGS. 11-14 are various examples of determining the position and orientation of a commonly viewed virtual object in accordance with step 1024 of FIG. 10. It should be understood that FIGS. 11-14 are exemplary only and numerous other methods of determining a common or optimal viewing position may be used in accordance with the present technology. As noted herein, each virtual object may include one or more object definitions including information on one or more optimal viewing perspectives for the object. In FIG. 11A, a common virtual object 1125 is illustrated. In one example, the common virtual object 1125 is a picture frame or other generally flat object. The object 1125 includes an optimal viewing perspective illustrated by arrow 1130. The arrow 1130 illustrates an optimal direction at which to view the virtual object 1125. It should be understood that optimal viewing perspective illustrated by arrow 1130 is in three dimensional space and represents an optimal orientation of the object relative to a viewer facing the object directly. That is, the arrow 1130 has a two dimensional position (X, Y) relative to the object and a magnitude in the Z direction which may indicate an optimal distance.

In the examples shown in FIGS. 11-14, the exemplary methods determine position and orientation of the virtual object based on the number of users who are viewing the virtual object 1125. It should be understood that other triggering factors may determine starting point for a method of determining a common view point for virtual object. For example, the object definition may indicate that irrespective of user numbers, the virtual object should be viewable by every user in a common environment so that, should a determination be made that an environment is so crowded that no optimal viewing position may be comfortably found for all users, the object should be enlarged and shown above the heads of all users.

Turing to FIG. 11A, at step 1102, object data and user position data is retrieved. If, at step 1104, the number of users viewing the common virtual object is two, the method proceeds to step 1106. If a different number of users is determined, the method proceeds to that number of users at 1150.

Two users 1162 and 1160 are viewing object 1125. At step 1106, an initial determination may be to calculate a midpoint 1127 between the first user and the second user. At 1108, the orientation, position and size data from the object definition, as well as any other object specific definitions are determined. This includes determining the optimal viewing perspective and orientation of the virtual object. In FIG. 11B, the object 1125 is shown positioned at the midpoint 1127 before the common/optimal viewing location and perspective is known. It will be noted that (like FIG. 1B), one user (user 1162) would have an optimal view of the object (relative to perspective 1130), while the other (user 1160) would not.

At step 1110, the method calculates a common/optimal viewing position and orientation relative to the size of the object and the object definitions. In this example, the common/optimal viewing position at point 1137 is selected to be a point equidistant from users 1160 and 1162 and at the same relative angle offset from a ray to the midpoint calculated in step 1106, so that each user 1160, 1162 has the same relative perspective and perceives the object at the same relative physical location in space. It should be noted that if the object is a relatively small item, the distance rendered may be small while if large, the distance may likewise be large. The orientation of the object places the perspective 1130 in an equal relationship to each viewer. In other embodiments, the orientation relative to each user may not be the same. In this example, the relative perspective of each user 1160, 1162 is at the same angle A.

FIGS. 12A-12C illustrate a three user scenario with the same virtual object 1125. An additional user 1164 is shown relative to users 1160 and 1162. FIG. 12A initially determines whether three users are present at 1202. If so, then at 1204 the orientation, position and size data from the object definition, as well as any other object specific definitions are determined. At 1206, a common location 1227 between users 1160, 1162 and 1164 is determined. The common location 1227 may be a relative midpoint between the three users or some other relative point between the users, with the relative point weighting toward or away from one or more users depending on, for example, whether the user is a sharing user. After calculating the common location, the optimal perspective and any positioning limitations of the object are determined at 1210. At 1212, the field of view of each of the users are considered. The field of view of each user is considered since the available area for common viewing locations between the users is reduced to the area between the positions of users, with the potential that one of the users might block rendering at other locations. (In the two user scenario, any location to the right or left of the midpoint will be free of the other user).

At 1214, a common/optimal viewing location and orientation is calculated relative to the size of the object and the object definition. The object position is determined as a location defined within a local coordinate system based on a relative angle and distance from users 1160, 1162 and 1164.

FIGS. 12B and 12C illustrate the common location 1227 and the common viewing location 1327 calculated as a result of the method of FIG. 12A. In one embodiment, the calculated result of step 1214 may be calculated by initially considering the size of the object retrieved from the object definition. Size may determine an optimal distance of the object relative to the user. Alternatively, the object definition may have an explicitly defined optimal distance for the object. Next, optimal and acceptable viewing perspectives for the object as provided in the objects definition are considered. Next, relative to the determined common point, a determination of a maximum angle of movement of the object from the common point to a new location at the selected distance may be determined. It may be that where there are three or more users viewing the common object, not every user will be subject to movement of the object at the maximum movement angle. As a result, a determination must be made as to which user will see the object move more relative to the common point, and which user will see the object move less. Stated another way, the method may determine which user is subject to a greater move angle and which user is subject to a small group angle. Again, the determination of which user is subject to the greater or lesser move angles may be based on the object definition, whether or not a user is sharing the virtual object, or whether or not the object shared by a third party. Once the distance and angles relative to each of the users are considered, an optimal/common viewing location and perspective is determined and translated into the local coordinate system for use by the head mounted displays in rendering the virtual object in the common environment.

In the example shown in FIGS. 12B and 12C, the relative angles B, C, and D between the user and the common point and the user and the common viewing location 1327 are all different and oblique.

FIGS. 13A-13D illustrate a three user scenario with a three dimensional virtual object 1325. The three dimensional virtual object 1325 (represented in FIGS. 13B-13D as a bicycle) may differ from virtual object 1125 in that a number of optimal perspectives 1330 (in this example three) may be provided. In FIG. 13B, three common viewing orientations or perspectives 1330 are shown. In one case, all three perspectives may be weighted equally, while in another embodiment, one or more by be given greater weight as "optimal" perspectives, with lesser defined perspectives being weighted as acceptable.

FIG. 13A initially determines whether three users are present at 1302 in the common environment. If not, the method proceeds to a calculation appropriate to the number of users in the environment at 1350. If so, then at 1304, user orientation, object type data and user positions are retrieved. At 1306, a common location 1327 between users 1360, 1362 and 1364 is determined. Once a common location is determined, orientation and position limitations defined with the object definition are retrieved at 1310. These may include the size of the object, limits on viewing angles, and a determination of the optimal viewing perspectives relative to the acceptable perspectives of the virtual object. At 1312, the field of view of each user is determined. Finally, at 1314, a common/optimal position is calculated. The common viewing position is calculated relative to the size of the object and sets the object position at a location defined in the local coordinate system based on angles relative to each of the users and the distance from users 1360, 1362, and 1364.

FIG. 13B illustrates a virtual object 1325 in a common location between users 1360, 1364, 1362. FIG. 13C illustrates the virtual object 1325 in the calculated result common/optimal viewing position relative to users 1360, 1362, and 1364. Between FIGS. 13B and 13C, users 1360, 1362, and 1364 have not changed positions. It is possible, however, that users 1360, 1362, and 1364 will change positions necessitating a change in the common/optimal viewing position of the virtual object 1325. Between FIGS. 13C and 13D, user 1364 and user 1362 have changed positions. As a result of this change, the method will return via step 1030 and process a movement of the virtual object relative to the users. As noted in FIG. 13D, virtual object 1325 has shifted positions relative to the movement of the users. In FIG. 13D, object 1325 has moved slightly to the left at a new optimal viewing point 1329 relative to viewing point 1328 in FIG. C.

Figure 14B:
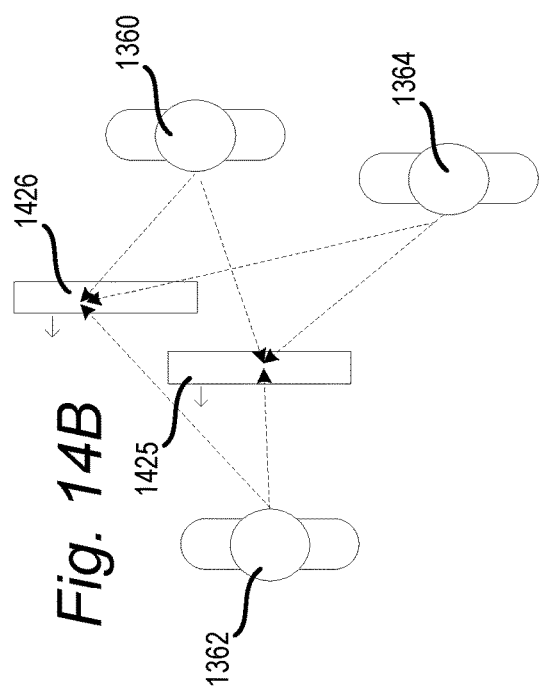
FIGS. 14B and 14C illustrate various positions of multiple virtual objects.
Figure 14C:
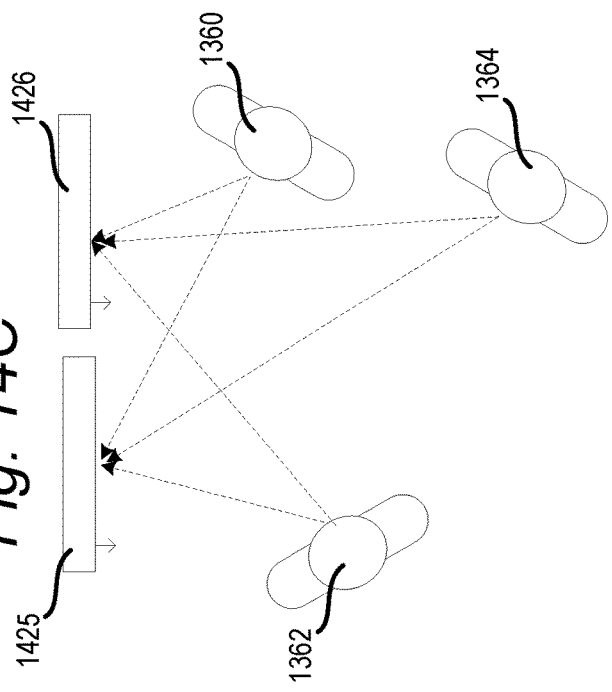
Figure 14A:
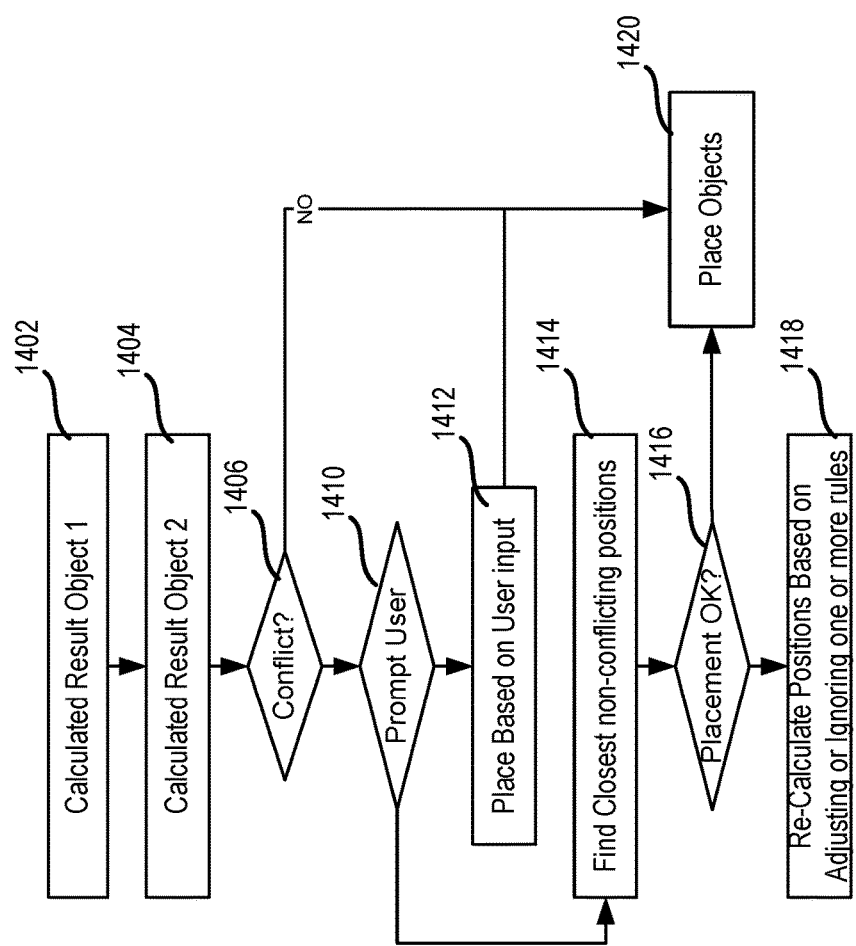
FIG. 14A illustrates a method of resolving positional conflicts between commonly viewed objects.

FIGS. 14A, 14B, and 14C illustrate a scenario where multiple virtual objects are present. The method of FIG. 14 illustrates an additional method used in step 1024 (in conjunction with the results of step 1024) to reconcile conflicts between the calculated results of positions of two virtual objects. It should be understood that additional virtual objects may be in conflict in any given common environment, and the method of FIG. 14A may be extended to account for any number of additional virtual objects. At step 1402 and 1404, the calculated results of two common/optimal positions for virtual objects in a single common environment are received. At step 1406, a determination is made as to whether or not a conflict in the calculated positions of the objects exists. If no conflict exists, then the position of the objects may be forwarded to the head mounted displays. If a conflict exists at 1406, then, optionally, a user may be prompted for user input at 1410. User input may comprise one or more of a user preference as to where to place the object, or direct user manipulation concerning the placement of the object in the common environment. If user input is provided, then at 1412, the object is placed based on the user input and the data forwarded to the head mounted displays at 1420. If the user does not provide input, then at 1414, a determination is made as to the closest non-conflicting common viewing positions available at 1414. The closest non-conflicting positions may be determined in accordance with the location determination by adjusting for the size of the objects, the angle relative to the individuals, and the selected distance relative to the users. All the rules can be accounted for in the placement is okay at 1416, the object will be positioned at 1420. If not, the system will recalculate new positions based on adjusting or ignoring one or more of the parameters in the calculation. For example, the system may increase the distance at which the objects are placed relative to the users, alternatively, the system may increase or decrease the angles relative to one of the users was previously indicated to be a user for whom adjustment should be prioritized.

FIG. 14B illustrates two virtual objects 1425 and 1426 relative to three users 1360, 1362 and 1364. The two virtual objects are in conflicting locations in that the two common points of each user obscure the view of one or more of the users.

FIG. 14C illustrates virtual objects 1425 and 1426 placed at a first common viewing point in a second common viewing point relative to each of the users. The common viewing points to not conflict, allowing each user the best possible view of each of the virtual objects 1425 and 1426.

It should be understood by reference to FIGS. 11-14 that where the number of users viewing a virtual object exceeds a threshold—such as in a situation where a common virtual object is placed in a business such as a coffee shop, an optimal or common calculation may not be available to account for each and every user potentially viewing a common view virtual object. In such cases, the definition of the placement of the virtual object may be left to the owner of the common space, the owner of the shared object, or may take into account an average or weighed position for the total number of users in the pace an position the virtual object in a "best" or optimal viewing location based on summing the relative positions of users to determine weighted positions relative to the object.

Any one or more of the methods herein may be implemented by computer readable code stored on a computer storage medium which may be suitably read by any one or more of hub computing system 12, the processing unit 4 and/or head mounted display device 2.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for rendering a virtual object in a see-through head mounted display, comprising:

determining position, orientation and field of view for a group of users comprising at least a first user and a second user in a coordinate system shared by the group of users;

detecting movement of a first position of the first user;

determining, based on detecting movement of the first position of the first user and based on the first position, the field of view for the group of users, and a size of at least one commonly viewed virtual object, a common viewing location for the at least one commonly viewed virtual object within the coordinate system shared by the group of users;

based on a determination of whether the first user is sharing the at least one commonly viewed virtual object, determining, based on the common viewing location, an amount for repositioning the at least one commonly viewed virtual object from a first object position in the coordinate system to a second object position in the coordinate system for display on the see-through head mounted display of the first user;

repositioning, based on the amount for repositioning, the at least one commonly viewed virtual object from the first object position in the coordinate system to the second object position within the coordinate system;

sharing at least the second object position from perspectives of the first user and the second user; and rendering the object in the see-through head mounted display of the first user and second user using the second object position.

2. The method of claim 1 wherein determining the common viewing location further comprises:

determining, from the commonly viewed virtual object, orientation and position rules governing the positioning of the at least one commonly viewed virtual object relative to a user, wherein determining the common viewing location is based at least in part on calculating, based on the orientation and position rules, an object position based on a relative angle to and distance from each user in the group of users.

3. The method of claim 2 wherein determining the common viewing location further comprises:
determining a distance from at least the first user and the second user to the at least one commonly viewed virtual object for an optimal view;
determining at least an acceptable viewing perspectives for the at least one commonly viewed virtual object;
determining a maximum angle of movement between a midpoint location and the optimal view; and
wherein determining the common viewing location is further based on said distance, acceptable viewing perspectives and maximum angle of movement.

4. The method of claim 1 wherein each commonly viewed virtual object includes an object definition including at least an optimal view.

5. The method of claim 1 further comprising determining a position, orientation and field of view for at least a third user in the group of users, wherein determining the common viewing location is further relative to the first user, the second user, and the third user, and wherein sharing at least the second object position in the coordinate system is from a perspective of the first user, the second user and the third user to allow rendering of the at least one commonly viewed virtual object based on the repositioning.

6. The method of claim 1 further comprising determining the optimal view of at least two commonly viewed virtual objects relative to the first user and the second user.

7. The method of claim 1 further comprising:
detecting an additional movement of the first user and the second user;
determining, based on detecting the additional movement, a second common location that is common to at least a third position of the first user and a fourth position of the second user at an instant after the additional movement, wherein the third position of the first user is determined from the see-through head mounted display of the first user at the instant after the additional movement, and wherein the fourth position of the second user is determined from the see-through head mounted display of the second user at the instant after the additional movement;
determining, based on the second common location, a second amount for a subsequent repositioning of the at least one commonly viewed virtual object from the second object position to a third object position in the coordinate system for display on the see-through head mounted display of the first user; and
repositioning, based on the second amount for subsequent repositioning, the at least one commonly viewed virtual object.

8. The method of claim 1, further comprising determining, using an eye tracking device, an eye orientation of the first user, wherein determining the common viewing location for the at least one commonly viewed virtual object is further based on the eye orientation of the first user.

9. The method of claim 1, wherein determining the common viewing location includes determining, based on the size of the at least one commonly viewed virtual object, a distance from the first user for rendering the at least one commonly viewed virtual object, wherein determining the common viewing location is further based on the distance.

10. A see through head mounted display apparatus, comprising:

a see through head mounted display;
a processor and a storage device including code for rendering virtual objects on the display, and code for instructing a processor to:
determine, based on a detected movement of a first position of a first user, the first position, a first orientation and a first field of view of the first user and a the second position, a second orientation and a second field of view of a second user in an environment, wherein the first position of the first user is determined from the see-through head mounted display apparatus of the first user at an instant after the movement of the first position of the first user, and wherein the second position of the second user relative to the first user is determined from a second see-through head mounted display of the second user at the instant after the movement of the first position of the first user;
determine a position of at least one shared virtual object relative to the first user and the second user;
determine a common location that is common to at least the first position of the first user and the second position of the second user at the instant after the detected movement of the first user;
determine orientation and position rules, from data associated with the at least one shared virtual object, governing the positioning of the at least one shared virtual object relative to a user;
calculate a commonly viewed virtual object position and orientation based on the first position of the first user, the second position of the second user, and a size of the at least one shared virtual object;
based on a determination of whether the first user or the second user is sharing the at least one commonly viewed virtual object, adjusting the commonly viewed virtual object position and orientation; and
move the at least one shared virtual object to the commonly viewed virtual object position and orientation as adjusted.

11. The apparatus of claim 10 wherein the storage device includes at least one object definition for the at least one shared virtual object, the object definition including object size and optimal position data.

12. The apparatus of claim 11 wherein said object definition includes acceptable viewing angles of the at least one shared virtual object relative to the users.

13. The apparatus of claim 12 wherein the storage device further comprises code for:
determining a distance from at least the first position of the first user and the second position of the second user to the commonly viewed virtual object position;
determining at least an acceptable viewing perspectives for the at least one shared virtual object;
determining a maximum angle of movement between a common point and the commonly viewed virtual object position; and
based on said distance, acceptable viewing perspectives and maximum angle of movement, calculating the commonly viewed virtual object position and orientation.

14. The apparatus of claim 13 wherein the storage device further comprises code for:
determining said distance from at least the first position of the first user and the second position of the second user to the commonly viewed virtual object position based on the at least one object definition.

15. The apparatus of claim 13 wherein the storage device further comprises code for:
  determining at least an acceptable viewing perspectives for the at least one shared virtual object from the at least one object definition.

16. The apparatus of claim 13 wherein the storage device further comprises code for:
  detecting an additional movement of the first user and the second user;
  determining, based on detecting the additional movement, a second common location that is common to at least a third position of the first user and a fourth position of the second user at an instant after the additional movement, wherein the third position of the first user is determined from the see-through head mounted display of the first user at the instant after the additional movement, and wherein the fourth position of the second user is determined from the second see-through head mounted display of the second user at the instant after the additional movement;
  calculating a second commonly viewed virtual object position and orientation, equidistant between the first and second users, based on an optimal view of the at least one shared virtual object for the first and second users, the optimal view determined using the orientation and position rules, and a relative angle to each user and the second common location; and
  move the at least one shared virtual object to the second commonly viewed virtual object position and orientation.

17. A method, comprising:
  receiving data indicating a position, orientation and field of view for a first user in an environment;
  determining, based on receiving the data for the first user, a position, orientation and field of view for a second user in the environment;
  determining, based on receiving the data for the first user, a common location that is common to at least a first position of the first user and a second position of the second user at an instant after the movement of the first user, wherein the first position of the first user is determined from a see-through head mounted display of the first user at the instant after movement of the first user, and wherein the second position of the second user relative to the first user is determined from a second see-through head mounted display of the second user at the instant after the movement of the first user;
  accessing a shared virtual object, the shared virtual object having a front;
  determining, based on the common location and a size of the shared virtual object, a common viewing position of the shared virtual object relative to the first user and the second user;
  sharing object data and the common viewing position with the first user;
  based on a determination of whether the second user is sharing the at least one commonly viewed virtual object, adjusting the common viewing position; and
  rendering the object in the second see-through head mounted display using the object data and common viewing position data as adjusted.

18. The method of claim 17 further comprising:
  accessing a second shared virtual object;
  determining, based on the common location, a second common viewing position for the second shared virtual object;
  determining whether a conflict exists between rendering the shared virtual object at the common viewing position and the second shared virtual object at the second common viewing position; and
  if a conflict exists, resolving the conflict by altering at least one of the common viewing position and second common viewing position.

19. The method of claim 17 wherein determining a common viewing position includes the step of:
  determining, from the shared virtual object, orientation and position rules governing the positioning of the shared virtual object relative to a user; and
  calculating an object position based on a relative angle to and distance from each user in the group of users.

20. The method of claim 17 further comprising:
  determining a distance from at least the first user and the second user to the common viewing position;
  determining at least an acceptable viewing perspectives for the shared virtual object;
  determining a maximum angle of movement between a common point and the common viewing position; and
  based on said distance, acceptable viewing perspectives and maximum angle of movement, determining the common viewing position.

21. The method of claim 20 further comprising:
  detecting an additional movement of the first user and the second user;
  determining, based on detecting the additional movement, a second common location that is common to at least a third position of the first user and a fourth position of the second user at an instant after the additional movement, wherein the third position of the first user is determined from the see-through head mounted display of the first user at the instant after the additional movement, and wherein the fourth position of the second user is determined from the second see-through head mounted display of the second user at the instant after the additional movement;
  determining, based on the second common location, a second common viewing position of the shared virtual object relative to the first user and the second user, the second common viewing position representing a position midway between the first and second users, and provided at an angle so that the front of the shared virtual object is angled toward the first and second users so as to be equally facing the first and second users; and
  sharing object data and the second common viewing position with the first user.

22. The method of claim 17 further comprising receiving user manipulation of the shared virtual object, wherein determining the common viewing position is further based on the user manipulation.

23. A see through head mounted display apparatus, comprising:
  a see through head mounted display;
  a processor and a storage device including code for rendering virtual objects on the display, and code for instructing a processor to:
    determine position, orientation and field of view of a first user and a second user in an environment, wherein a first position of the first user is determined from a first see-through head mounted display apparatus of the first user at an instant after the movement of the first user, and wherein a second position of the second user relative to the first user is determined from the see-through head mounted display of the second user at the instant after the movement of the first user;
determine a position of at least one shared virtual object relative to the first user and the second user;
determine a common location that is common to at least the first position of the first user and the second position of the second user at the instant after a detected movement of the first user;
identify a size of the at least one shared virtual object from object definition rules associated with the at least one shared virtual object;
calculate a commonly viewed virtual object position and orientation based on an optimal view of the at least one shared virtual object for the first and second users, the optimal view determined using the size of the at least one shared virtual object from the object definition rules, a relative angle offset from a ray to a midpoint location determined to be equidistant between the first position of the first user and the second position of the second user;
based on a determination of whether the first user or the second user is sharing the at least one commonly viewed virtual object, adjusting the commonly viewed virtual object position and orientation; and
move the at least one shared virtual object to the commonly viewed virtual object position and orientation as adjusted.

24. The apparatus of claim 10 wherein the storage device includes at least one object definition for the at least one shared virtual object, the object definition rules including object size and optimal position data.

25. The apparatus of claim 24 wherein said object definition rules includes acceptable viewing angles of the object relative to the users.

26. The apparatus of claim 10 wherein the storage device further comprises code for:
determining said common location from at least the first user and the second user to the at least one shared virtual object position based on the object definition rules.

27. The apparatus of claim 10 wherein the storage device further comprises code for:
determining at least an acceptable viewing perspectives for the at least one shared virtual object from the object definition rules.

28. The apparatus of claim 10 wherein the storage device further comprises code for:
detecting an additional movement of the first user and the second user;
determining, based on detecting the additional movement, a second common location that is common to at least a third position of the first user and a fourth position of the second user at an instant after the additional movement, wherein the third position of the first user is determined from the see-through head mounted display of the first user at the instant after the additional movement, and wherein the fourth position of the second user is determined from the second see-through head mounted display of the second user at the instant after the additional movement;
calculating a second commonly viewed virtual object position and orientation based on an optimal view of the at least one shared virtual object for the first and second users, the optimal view determined using the size of the at least one shared virtual object from the object definition rules, a relative angle to the first and second users, and the second common location; and
moving the at least one shared virtual object to the second commonly viewed virtual object position and orientation.

* * * * *